United States Patent
Mouniandy et al.

(10) Patent No.: US 11,831,273 B2
(45) Date of Patent: Nov. 28, 2023

(54) SOLAR TRACKER SYSTEM INCLUDING A CABLE SYSTEM

(71) Applicant: FTC Solar, Inc., Austin, TX (US)

(72) Inventors: Tamilarasan Mouniandy, Chennai (IN); Nagendra Srinivas Cherukupalli, Saratoga, CA (US); Rajesh Shanmugasundaram, Chennai (IN); Baskaran Subbarayan, Chennai (IN)

(73) Assignee: FTC Solar, Inc., Austin, TX (US)

( * ) Notice: Subject to any disclaimer, the term of this patent is extended or adjusted under 35 U.S.C. 154(b) by 0 days.

(21) Appl. No.: 18/067,338

(22) Filed: Dec. 16, 2022

(65) Prior Publication Data

US 2023/0198457 A1 Jun. 22, 2023

Related U.S. Application Data

(60) Provisional application No. 63/265,533, filed on Dec. 16, 2021.

(51) Int. Cl.
*H02S 20/32* (2014.01)
*H02S 30/10* (2014.01)
(Continued)

(52) U.S. Cl.
CPC ............ *H02S 20/32* (2014.12); *F24S 30/425* (2018.05); *H02S 30/10* (2014.12); *F24S 2030/136* (2018.05); *F24S 2030/19* (2018.05)

(58) Field of Classification Search
CPC ........ H01L 31/00–078; H02S 20/00–32; F24S 30/00–48
See application file for complete search history.

(56) References Cited

U.S. PATENT DOCUMENTS

| 7,748,376 B2 | 7/2010 | Bender |
| 7,878,191 B2 | 2/2011 | Bender |

(Continued)

FOREIGN PATENT DOCUMENTS

| CN | 203324823 U | 12/2013 |
| CN | 108181935 A | 6/2018 |

(Continued)

OTHER PUBLICATIONS

International Search Report and Written Opinion issued for Application No. PCT/US2022/081768, dated May 23, 2023, (15 pages).

*Primary Examiner* — Bach T Dinh

(74) *Attorney, Agent, or Firm* — Armstrong Teasdale LLP

(57) ABSTRACT

Solar tracker systems include an array of solar panels, a drive for rotating the array about a longitudinal axis, and a mounting assembly including a plurality of posts and a pivotable frame assembly supporting the array of solar panels on the posts. The frame assembly includes a first frame tube connected to the drive and extending therefrom in a direction parallel to the longitudinal axis and a second frame tube laterally offset from the first frame tube and extending parallel to the first frame tube. The first frame tube and second frame tube are sized to support at least one solar panel of the array of solar panels thereon. The frame assembly further includes a lateral beam attached to the first frame tube and the second frame tube.

15 Claims, 34 Drawing Sheets

(51) Int. Cl.
*F24S 30/425* (2018.01)
*F24S 30/00* (2018.01)

(56) References Cited

U.S. PATENT DOCUMENTS

| | | |
|---|---|---|
| 3,399,759 A1 | 3/2013 | Luo |
| 8,476,521 B2 | 7/2013 | Ou |
| 9,581,678 B2 | 2/2017 | Corio |
| 9,927,150 B2 | 3/2018 | Eckl et al. |
| 9,995,506 B2 | 6/2018 | Doyle |
| 10,630,230 B2 | 4/2020 | Lou |
| 11,050,383 B2 | 6/2021 | Watson |
| 11,159,120 B2 | 10/2021 | Kresse et al. |
| 11,509,258 B2 | 11/2022 | Melton et al. |
| 2008/0308091 A1 | 12/2008 | Corio |
| 2009/0038672 A1 | 2/2009 | Conger |
| 2009/0114211 A1 | 5/2009 | Homyk et al. |
| 2011/0186040 A1 | 8/2011 | Liao |
| 2013/0019921 A1 | 1/2013 | Au |
| 2015/0311856 A1 * | 10/2015 | Luo .......... F24S 25/13 52/173.3 |
| 2015/0377520 A1 | 12/2015 | Kufner |
| 2020/0076356 A1 | 3/2020 | Cherukupalli et al. |
| 2021/0058025 A1 | 2/2021 | Dechant |
| 2021/0336579 A1 * | 10/2021 | Sun .......... F24S 30/42 |

FOREIGN PATENT DOCUMENTS

| | | | |
|---|---|---|---|
| CN | 207937879 U | 10/2018 | |
| CN | 110138323 A | 8/2019 | |
| CN | 112486212 A | 11/2020 | |
| CN | 213027922 U * | 4/2021 | |
| CN | 213027922 U | 4/2021 | |
| CN | 113110610 A * | 7/2021 | |
| CN | 113110610 A | 7/2021 | |
| CN | 113708715 A | 11/2021 | |
| CN | 214704427 U | 11/2021 | |
| WO | WO-2009116701 A1 * | 9/2009 | ............ F24J 2/5232 |
| WO | 2019043612 A1 | 3/2019 | |
| WO | WO-2020078061 A1 * | 4/2020 | ............ F24S 30/42 |

\* cited by examiner

SOLAR TRACKER SYSTEM INCLUDING A CABLE SYSTEM

CROSS-REFERENCE TO RELATED APPLICATIONS

This application claims the benefit of U.S. Provisional Patent Application No. 63/265,533 filed Dec. 16, 2021, which is incorporated herein by reference in its entirety.

FIELD

The field relates generally to systems for solar tracking and for securing solar photovoltaic (PV) panels on a solar array.

BACKGROUND

Solar arrays are devices that convert light energy into other forms of useful energy (e.g., electricity or thermal energy). One example of a solar array is a photovoltaic (PV) array that converts sunlight into electricity. Some photovoltaic arrays are configured to follow or track the path of the sun to minimize the angle of incidence between incoming sunlight and the photovoltaic array. Photovoltaic array assemblies may include a movable mounting system that supports and tilts the photovoltaic array and connects it to an anchoring structure.

During use, the photovoltaic array may be exposed to environmental loads, which can wear and cause damage to various components of the array. For example, during high load events, such as a high wind event, oscillating wind loads on the panels may cause portions of the array to vibrate, which can wear and cause damage to the array. Hydraulic or pneumatic damping assemblies, such as shock absorbers for example, may be used to dampen vibrations of the array during high wind events. However, shock absorbers can increase the cost of the array and require a complex installation and maintenance. Accordingly, a need exists for systems for that are not dependent on shock absorbers to overcome the ill effects of wind induced oscillations, while allowing for a lighter overall weight of the array.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a solar tracker system includes an array of solar panels, a drive for rotating the array about a longitudinal axis, and a mounting assembly including a plurality of posts and a pivotable frame assembly supporting the array of solar panels on the posts. The frame assembly includes a first frame tube connected to the drive and extending therefrom in a direction parallel to the longitudinal axis and a second frame tube laterally offset from the first frame tube and extending parallel to the first frame tube. The first frame tube and second frame tube are sized to support at least one solar panel of the array of solar panels thereon. The frame assembly further includes a lateral beam attached to the first frame tube and the second frame tube.

In another aspect, a frame assembly for a solar tracker system operable to rotate an array of solar panels about a longitudinal axis includes a first frame tube for connection to a drive of the solar tracker system. The first frame tube extends in a direction parallel to the longitudinal axis when connected to the drive. The frame assembly further includes a second frame tube laterally offset from the first frame tube and extending parallel to the first frame tube, the first frame tube and second frame tube being sized to support at least one solar panel of the array of solar panels thereon. The frame assembly further includes a lateral beam attached to the first frame tube and the second frame tube.

In yet another aspect, a method of assembling a solar tracker system includes connecting a first frame tube to a drive of the solar tracker system. The drive is operable to rotate an array of solar panels about a longitudinal axis. The first frame tube extends from the drive in a direction parallel to the longitudinal axis. The method further includes attaching a lateral beam to the first frame tube and attaching a second frame tube to the lateral beam such that the second frame tube is laterally offset from the first frame tube and extends parallel to the first frame tube. The method further includes mounting a solar panel of the array on the first frame tube and the second frame tube.

In yet another aspect, a solar tracker system includes an array of solar panels arranged in a row and defining a first lateral side and an opposed second lateral side and a drive for rotating the array about a longitudinal axis. The solar tracker system further includes a plurality of posts including a first post and a second post longitudinally spaced from the first post, wherein the drive is mounted on the first post. The solar tracker system further includes a first lateral beam connected to the drive and positioned adjacent to the first post, a second lateral beam positioned adjacent to the second post, and a cable attached to the first lateral beam at the first lateral side of the row. The cable extends from the first lateral beam and further attached to the second lateral beam at the second lateral side of the row.

In yet another aspect, a solar tracker system includes an array of solar panels arranged in a row and defining a first lateral side and an opposed second lateral side and a drive for rotating the array about a longitudinal axis. The solar tracker system further includes a mounting assembly connected to the drive for supporting the solar panels. The mounting assembly includes a plurality of lateral beams that are each longitudinally spaced from one another along the row. The solar tracker system further includes a cable tensioning system comprising a plurality of cables arranged in a network between adjacent lateral beams of the plurality of lateral beams. Each cable of the plurality of cables is attached to a first one of the lateral beams of the plurality of lateral beams at the first lateral side and is further attached to a second one of the lateral beams at the second lateral side.

In yet another aspect, a solar array row includes a plurality of solar panels defining a first lateral side and an opposed second lateral side of the solar array row and a drive for rotating the plurality of panels about a longitudinal axis. The row further includes a first post and a second post longitudinally spaced from the first post, where the drive is mounted on the first post. The row further includes a first lateral beam connected to the drive and positioned adjacent to the first post, a second lateral beam positioned adjacent to the second post, and a cable tensioning system. The cable tensioning system includes a cable attached to the first lateral beam at the first lateral side of the row which extends from the first lateral beam and is further attached to the second lateral beam at the second lateral side of the row.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
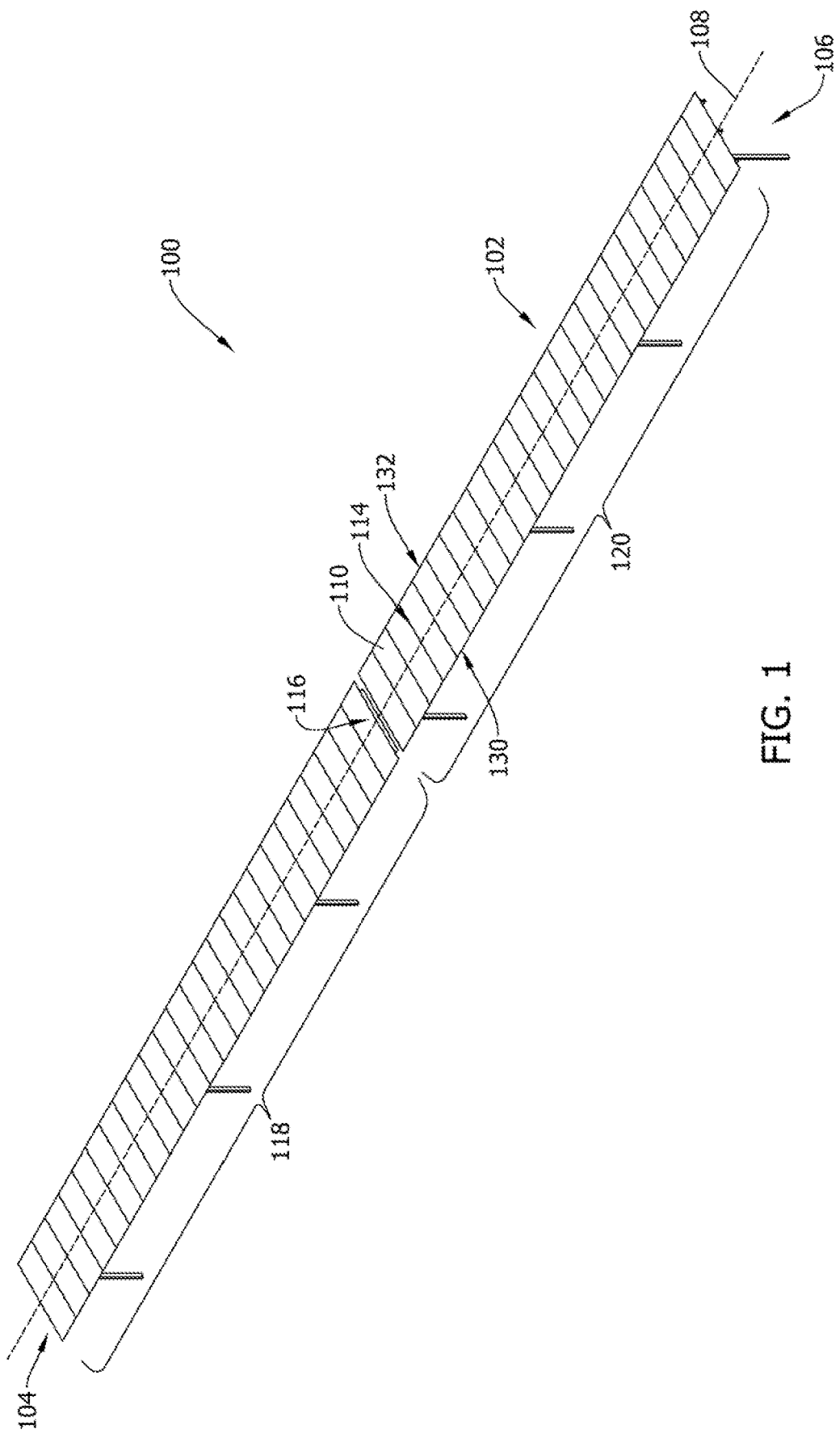
FIG. 1 is a perspective view of a solar tracker system.

An example solar tracker system 100 including a PV solar array row 102 is shown in FIG. 1. The solar array row 102 may be used in a solar power generation system. The solar array row 102 is used to generate power, typically in combination with a plurality of similarly arranged solar array rows of the solar tracker system 100 (not all rows shown). The solar array row 102 extends between a first end 104 and a second end 106 and defines a longitudinal axis 108 extending between the first and second ends 104, 106. The solar array row 102 includes a plurality of solar panel assemblies 110. Each solar panel assembly 110 extends between a back side 112 (shown in FIG. 2) and a panel side 114.

Figure 17:
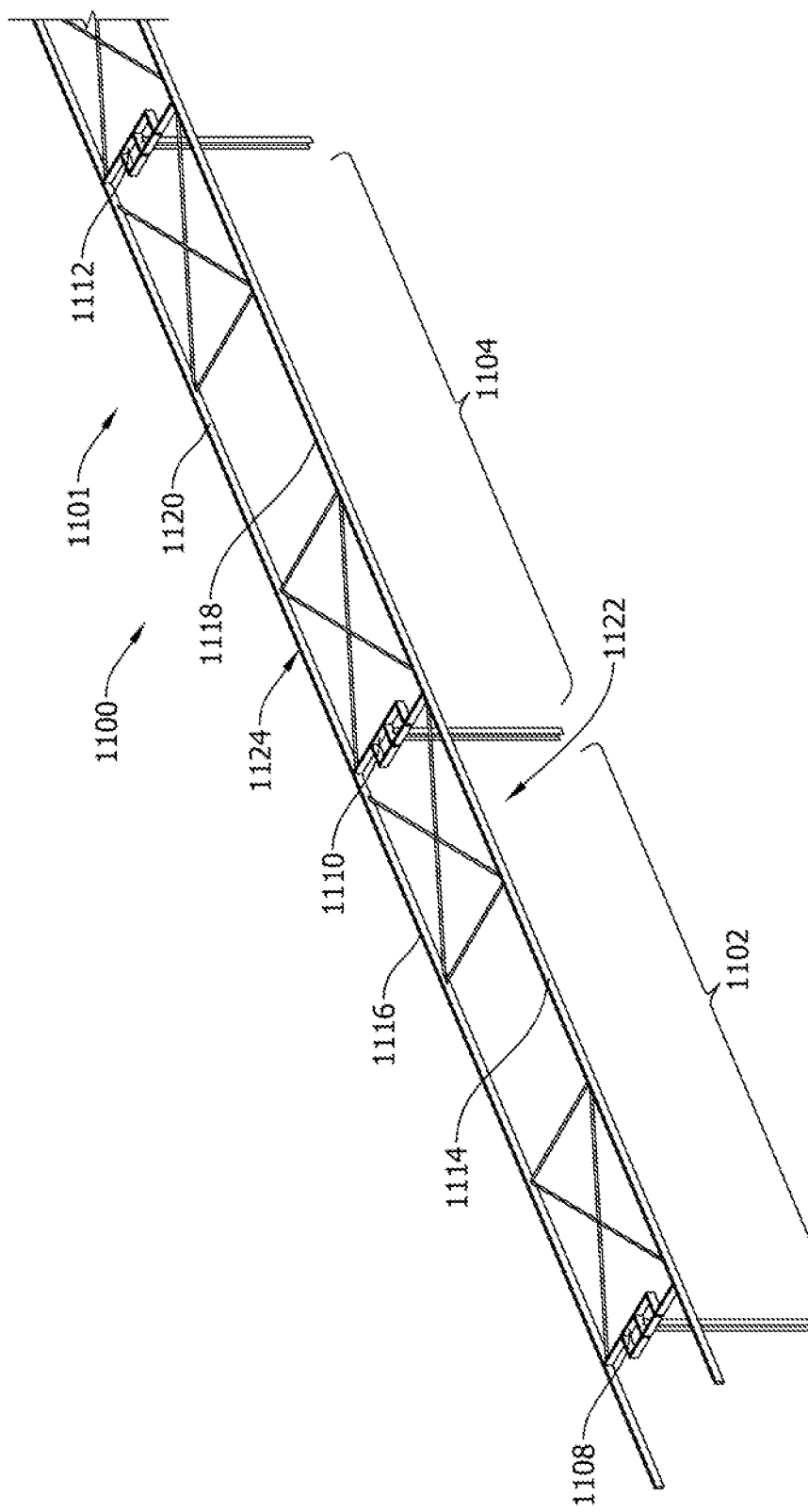
FIG. 17 is a perspective view of a portion of an alternative solar array row, showing the solar panels removed to reveal construction of array row.
Figure 18:
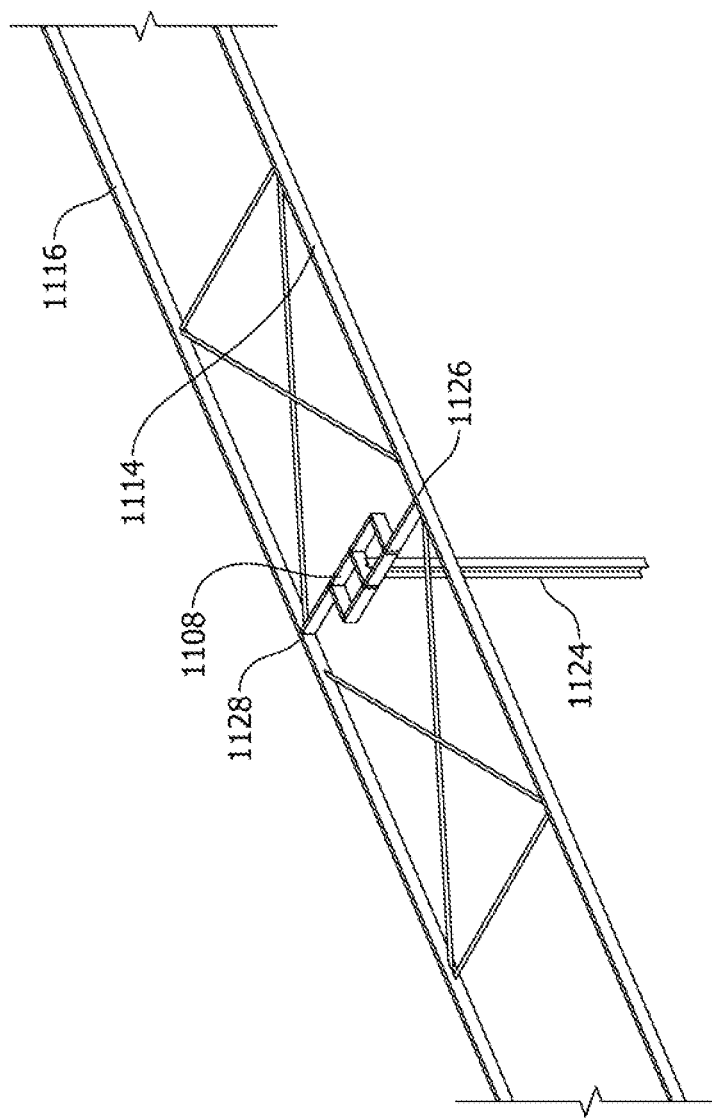
FIG. 18 is an enlarged perspective view of the solar array row shown in FIG. 17.

In the embodiment of FIG. 1, solar array row 102 is a two-panel or "2P" row (terms used interchangeably herein), in that it includes two rows of solar panel assemblies 110 positioned about the longitudinal axis 108 or "laterally stacked". In other embodiments, solar array row 102 may include any number of rows of panel assemblies 110, such as, and without limitation, one row of panel assemblies 110 as shown in the embodiment of FIGS. 17 and 18 and discussed in further detail below.

The solar array row 102 includes a drive 116 for rotating the panel assemblies 110 about the longitudinal axis 108, as described in greater detail below. The solar array row 102 defines a first section 118 extending from the first end 104 to the drive and a second section 120 extending from the drive 116 to the second end 106. The drive 116 is positioned substantially longitudinally in the middle of the solar array row 102. In other embodiments, the solar array row 102 may include multiple drives.

Figure 2:
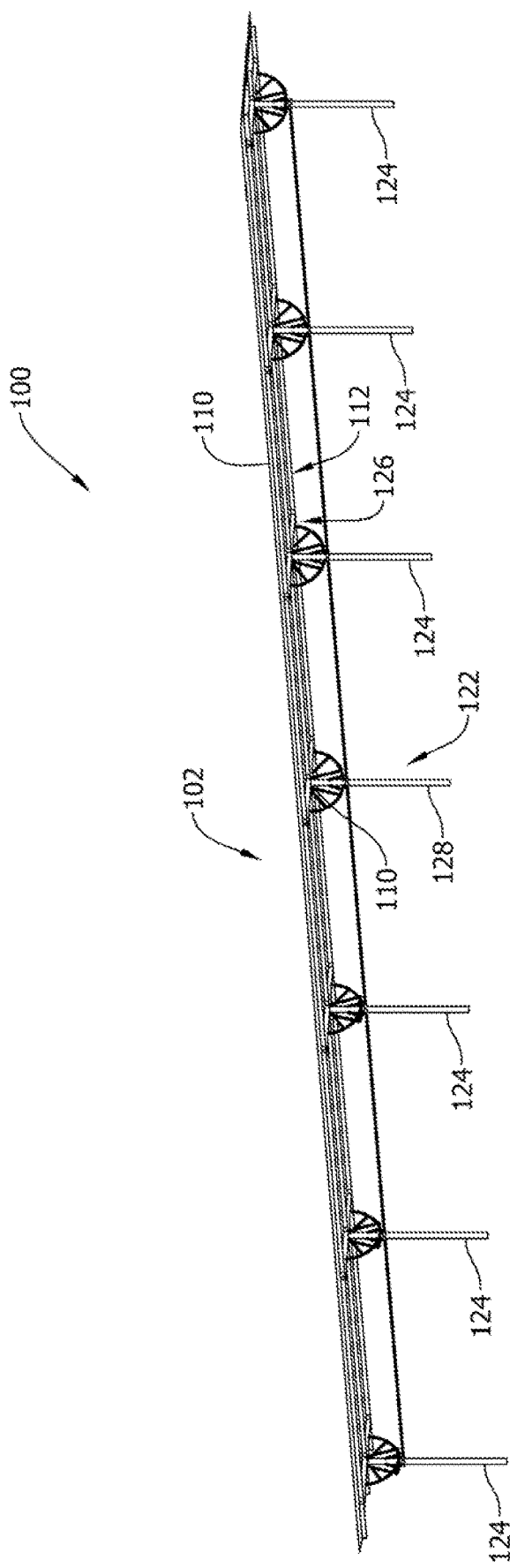
FIG. 2 is a bottom perspective view of the solar tracker system of FIG. 1.

Referring to FIG. 2, the solar array row 102 includes a mounting assembly 122 that supports the plurality of solar panel assemblies 110. The mounting assembly 122 includes a plurality of posts 124 and a pivotable frame assembly 126 to which the solar panel assemblies 110 are connected. The plurality of posts 124 includes a central post 128 which supports the drive. The pivotable frame assembly 126 is rotatably connected to each of the posts 124 to enable rotation of the solar panel assemblies 110 about the longitudinal axis 108 (shown in FIG. 1). As shown, the posts 124 are suitably I-beam posts but other types of posts may be used. The solar array row 102 of this embodiment includes seven posts 124, though any suitable number of posts may be used.

The posts 124 may be connected to a base (not shown) for securing the row 102 in a solar array field or any other suitable tracking environment. Generally, the base may include any structure that anchors the row 102, for example a stanchion, ram, pier, ballast, post or the like. The base may also include a foundation which encases a portion of the posts 124 or may include brackets, fasteners or the like that connect to the posts 124. In other embodiments, the row 102 may be connected to another structure which supports the solar panels (e.g., roof-top applications).

The solar panel assemblies 110 of this embodiment are a photovoltaic array. In other embodiments, the solar panel assemblies include a thermal collector that heats a fluid such as water. In such embodiments, the panel assemblies may include tubes of fluid which are heated by solar radiation. While the present disclosure may describe and show a photovoltaic array, the principles disclosed herein are also applicable to a solar array configured as a thermal collector unless stated otherwise.

Figure 3:
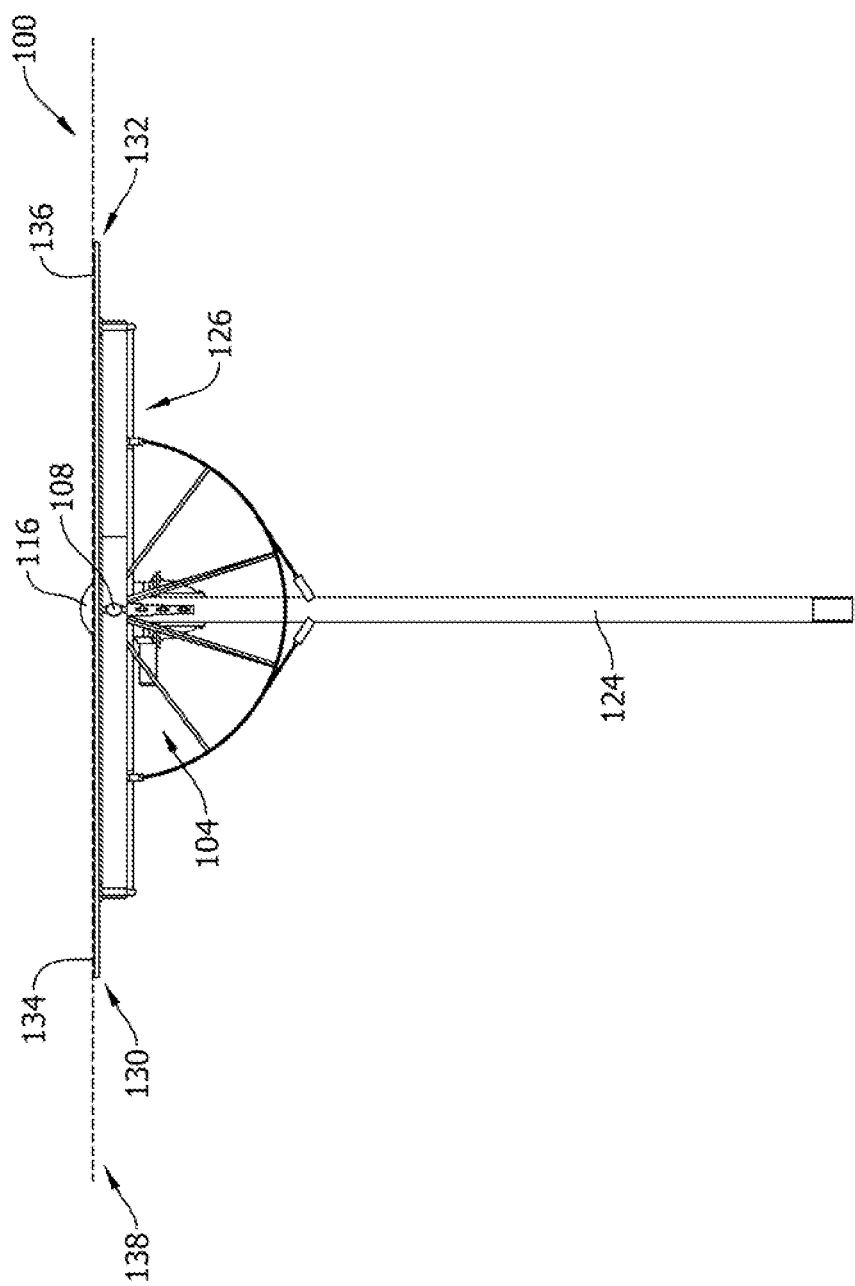
FIG. 3 is a side view of the solar tracker system of FIG. 1.

Referring to FIGS. 1 and 3, the panel assemblies 110 are positioned on the frame assembly 126 in a two-panel stack configuration, such that two panels are provided extending between a first side 130 and a second side 132. For example, as shown in FIG. 3, a first panel assembly 134 extends from the first side 130 of the row 102 inward toward the posts 124 and the longitudinal axis 108 of the row 102. Likewise, a second panel assembly 136 extends from the second side 132 of the solar array row 102 inward toward the first panel assembly 134. The panel assemblies 134, 136 collectively define a plane 138 of the solar array row 102 that extends along the surface of the panel assemblies 134, 136 and through the first and second sides 130, 132.

The drive 116 is selectively controllable to rotate the pivotable frame assembly 126 such that the panel assemblies 134, 136 follow the path of the sun, such as during movement of the sun over a course of a day. For example, the drive 116 rotates the panel assemblies 134, 136 such that the plane 138 of array is substantially perpendicular to a direction of sunlight directed at the panels throughout the day. In some methods, the panel assemblies 134, 136 are positioned based on seasonal variations in the position of the sun. The solar array row 102 may be a single axis tracker or a dual axis tracker with the pivotable frame assembly 126 defining at least one axis of rotation of the array. The other axis of rotation may be a vertical axis with rotation being achieved by a rotatable coupling and, optionally, a second drive (not shown). The solar array row 102 further includes a row controller (not shown) for controlling operation of the drive 116.

Figure 4:
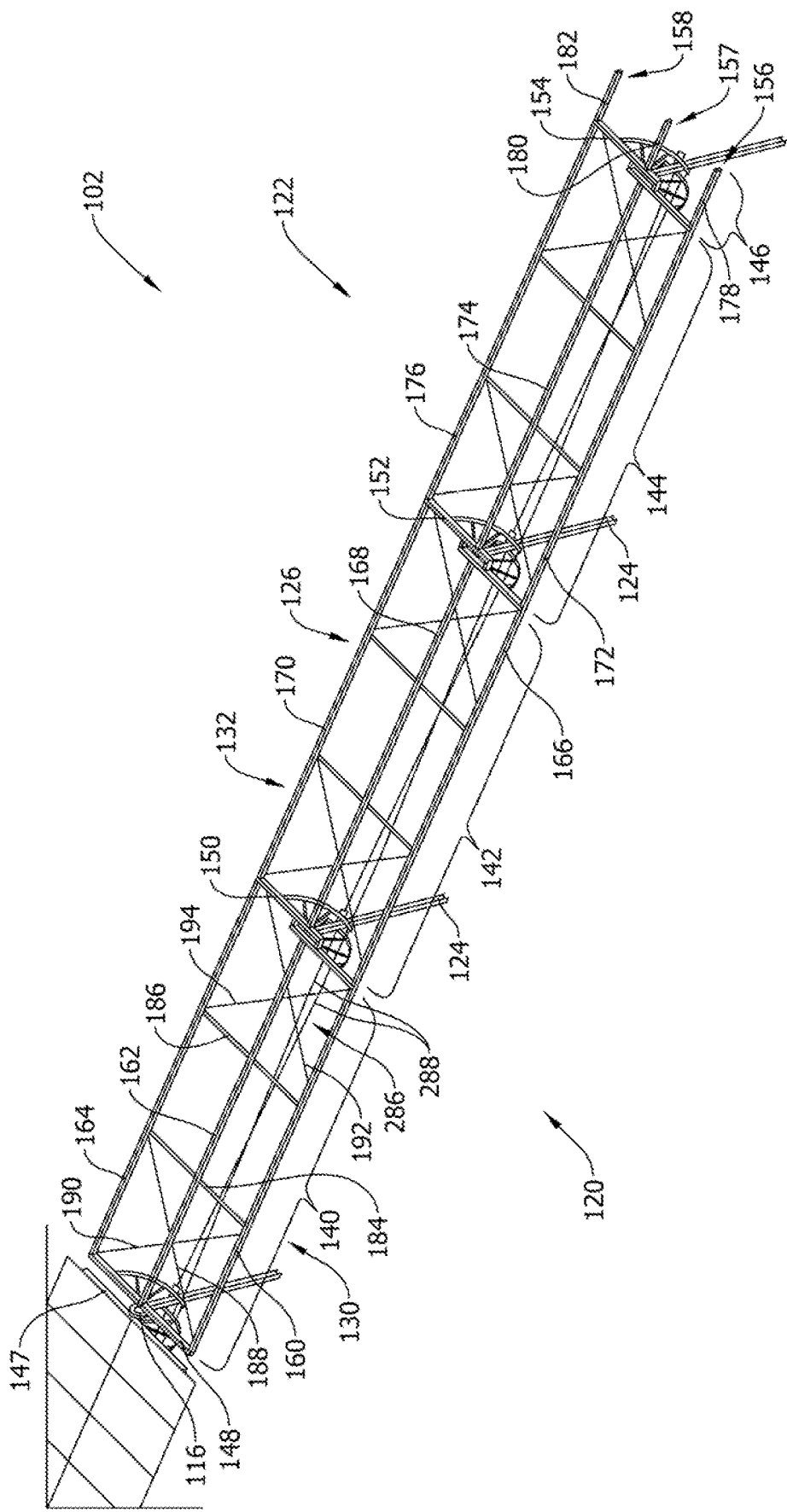
FIG. 4 is a perspective view of a portion of the solar array row of FIG. 1, with some of the solar panels removed to reveal construction of the array row.

FIG. 4 shows a portion of the solar array row 102 of FIG. 1 with the panel assemblies of the second section removed to reveal the construction of the mounting assembly 122. Although the mounting assembly 122 is described with respect to the second section of the row 102, the mounting assembly 122 is substantially the same in the first section 118 of the row 102 (FIG. 1) as in the second section.

Referring to FIG. 4, the frame assembly 126 includes a first frame section 140, a second frame section 142, a third frame section 144, and a fourth frame section 146. The frame assembly 126 further includes a first drive arm 147 and a second drive arm 148. The second drive arm 148 connects the frame sections 140, 142, 144, 146 to the drive 116. The frame assembly 126 further includes a plurality of H-tubes 150, 152, 154 for connecting adjacent frame sections 140, 142, 144, 146 to one another and for supporting the frame sections 140, 142, 144, 146 on the posts 124. The second drive arm 148 and H-tubes 150, 152, 154 are each oriented to extend laterally of the solar array row 102 between the first side 130 and the second side 132. The second drive arm 148 extends laterally outward from the post 124 to distal ends proximate the first side frame tube 160 and the second side frame tube 162. As used herein, the terms "longitudinal" or "longitudinally" generally refers to a direction, side, and/or orientation that is parallel to the longitudinal axis 108 (shown in FIG. 1), which is also coincident with a rotational axis of the row 102. As used herein, the term "lateral" or "laterally" generally refers to a direction, side, and/or orientation that is substantially perpendicular to the longitudinal direction and/or the longitudinal axis. For example, referring to FIG. 1, first and second ends 104, 106 are longitudinal ends of the row 102, whereas the first and second sides 130, 132 are lateral sides of the solar array row 102. The H-tubes 150, 152, 154 alternatively may be referred to herein as "lateral supports" or "lateral beams."

Figure 5:
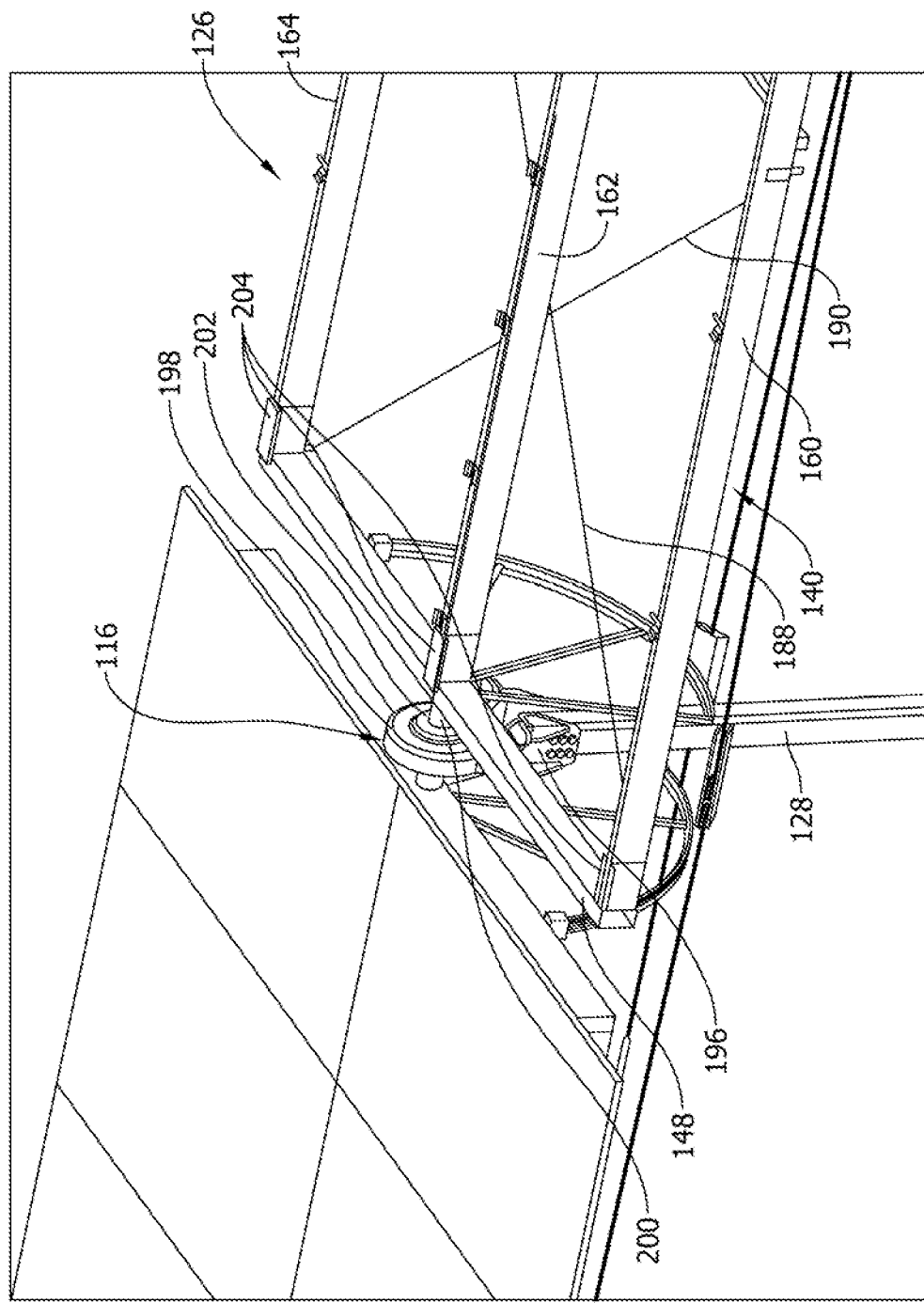
FIG. 5 is an enlarged perspective view of the portion of the solar array row of FIG. 4, showing a drive and a portion of a frame assembly of the solar array row.
Figure 7:
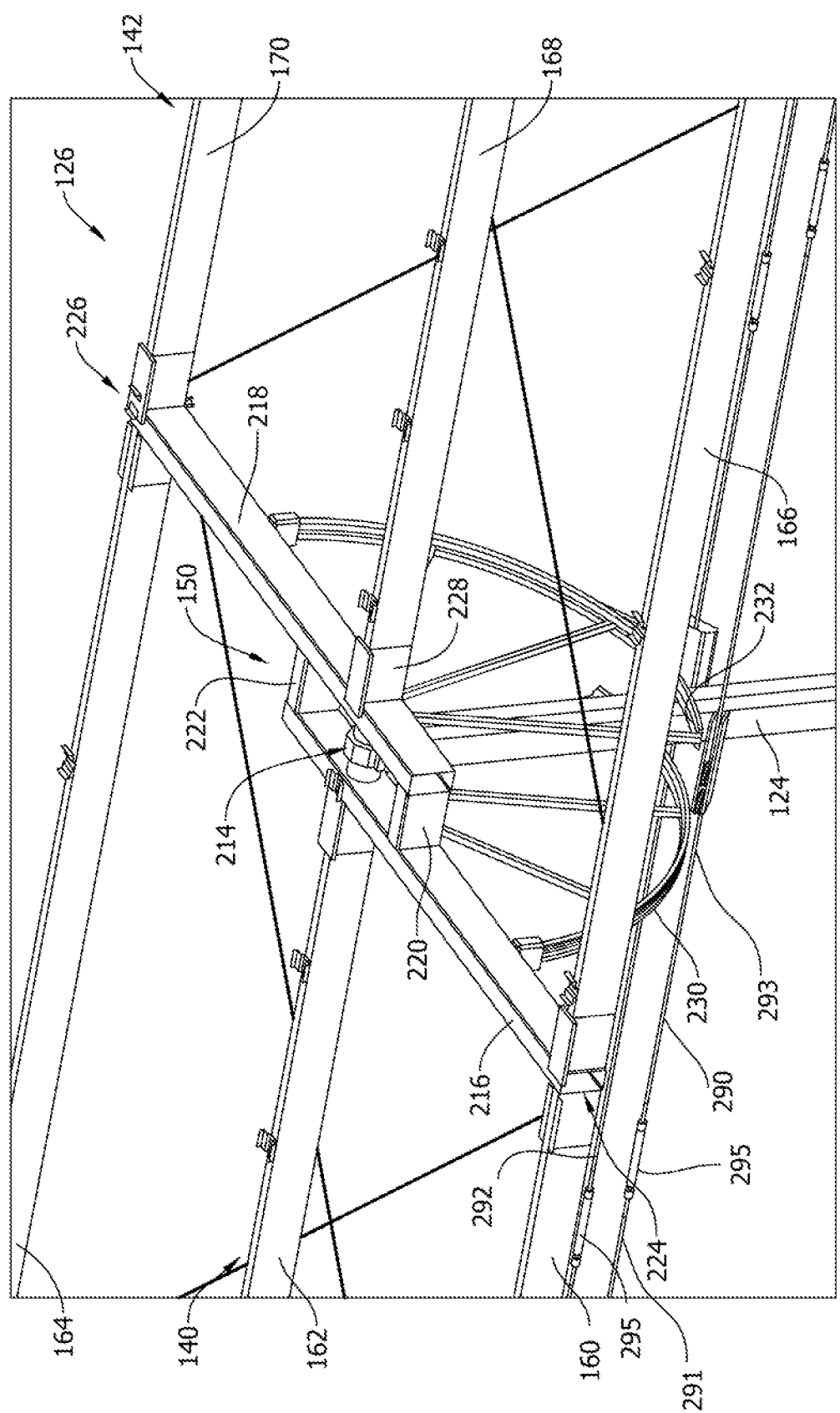
FIG. 7 is an enlarged perspective view of the portion of the solar array row of FIG. 4, showing an H-tube and a portion of the frame assembly of the solar array row.

Each of the frame sections 140, 142, 144, 146 includes frame tubes 160-182 that extend longitudinally along the row 102 between adjacent H-tubes 150, 152, 154 and/or the second drive arm 148. For example, as shown in FIG. 4, the first frame section 140 includes a first side frame tube 160, a central frame tube 162, and a second side frame tube 164, each fastened to and extending longitudinally from the second drive arm 148 to the first H-tube 150. The second frame section 142 includes a first side frame tube 166, a central frame tube 168, and a second side frame tube 170, each fastened to and extending longitudinally from the first H-tube 150 to the second H-tube 152. The third frame section 144 includes a first side frame tube 172, a central frame tube 174, and a second side frame tube 176, each fastened to and extending longitudinally from the second H-tube 152 to the third H-tube 154. The fourth frame section 146 includes a first side frame tube 178, a central frame tube 180, and a second side frame tube 182, each fastened to and extending longitudinally from the third H-tube 154 to the respective free distal ends 156, 157, 158 of the frame tubes 178, 180, 182. The first and second side frame tubes 160, 164, 166, 170, 172, 176, 178, 182 are each attached to adjacent arms of the drive and/or H-tubes at the distal ends of the arms and H-tubes (e.g., as shown in FIGS. 5 and 7). The frame tubes 160-182 are each made of steel though in other embodiments, any other suitable material may be used.

Each of the first, second, and third frame sections 140, 142, 144 include cross tubes 184, 186 extending between the frame tubes and oriented generally perpendicular to the longitudinal axis 108. For example, the first frame section 140 includes a first cross tube 184 mounted to the first side frame tube 160 and the second side frame tube 164. A second cross tube 186 is mounted to the first side frame tube 160 and the second side frame tube 164 and is positioned longitudinally between the first cross tube 184 and the first H-tube 150. The second and third frame sections 142, 144 each include two cross tubes that are substantially the same as the first and second cross tubes of the first frame section.

The frame assembly 126 further includes tie-rods 188-194 in each of the frame sections 140, 142, 144, 146. The first frame section 140 includes a first tie-rod 188 that is mounted to the first side frame tube 160 proximate the second drive arm 148 and the second side frame tube 164 proximate the first cross tube 184. A second tie-rod 190 is suitably mounted to the second side frame tube 164 proximate the second drive arm 148 and the first side frame tube 160 proximate the first cross tube 184. As shown in FIG. 5, the first and second tie-rod 188, 190 cross one another to generally form an "X"-shape in between the second drive arm 148 and the first cross tube 184.

Referring back to FIG. 4, two tie-rods 192, 194 are also mounted between the second cross tube 186 and the first H-tube 150 and are arranged in substantially the same "X"-shape as the first and second tie-rod 188, 190. Moreover, the second and third frame sections 142, 144 also include tie-rods that are arranged in substantially the same "X"-shape as the tie-rod of the first section 118. In this embodiment, the cross tubes and the tie-rods are suitably made of steel, though in other embodiments, any suitable material may be used.

The cross tubes 184, 186 and tie-rods 188-194 provide reinforcement to the frame tubes 160, 162, 164 and inhibit bending or twisting of the frame tubes 160, 162, 164 relative to one another. For example, during use, loading may be applied on the panels and the frame assembly 126 from one or more environmental events, such as precipitation (e.g., snow) or high wind events. The cross tubes 184, 186 and tie-rods 188, 190, 192, 194 provide structural reinforcement to resist bending or twisting of the frame tubes 160, 162, 164 when subjected to such environmental loading.

FIG. 5 shows an enlarged view of a portion of the solar row 102 shown in FIG. 4. The drive 116 is connected to the central post 128 by a drive bracket 196, and the drive 116 includes a drive housing 198 that is mounted to the drive bracket 196, and the drive bracket 196 is mounted to the central post 128. The drive 116 further includes at least one slewing ring (not shown) positioned within the housing 198 and being rotatable relative to the housing 198. The pivotable frame assembly 126 includes an end tube 200 that extends longitudinally from the second drive arm 148 to a plate 202 of the drive 116. The plate 202 is fastened to the slewing ring (not shown) of the drive 116.

In a suitable method, when actuated, the drive 116 rotates the slewing ring relative to the housing 198, thereby rotating the plate 202, the end tube 200, and the pivotable frame assembly 126 about the longitudinal axis 108 (shown in FIG. 1) of the row 102. In particular, the drive 116 engages the pivotable frame assembly 126 via the connection between the plate 202 and the slewing ring such that operation of the drive 116 causes the pivotable frame assembly 126 to rotate on the posts 124 (shown in FIG. 4) and rotate the panel assemblies 110 (shown in FIG. 1).

The drive 116 shown in FIG. 5 is a slew drive, though in other embodiments the mounting assembly 122 may include another suitable drive that enables the solar array row 102 to function as described. The drive 116 also engages the pivotable frame assembly 126 of the first row section 118 (shown in FIG. 1) in substantially the same manner as described with respect to the second row section 120. In this embodiment, the first row section 118 is also connected to the slewing ring and rotates with the ring as the frame assembly 126 of the second section 120 is rotated.

As shown in FIG. 5, the frame assembly 126 further includes a plurality of clamping brackets 204 for mounting each of the frame tubes 160-164 to the respective drive arms and H-tubes of the frame assembly 126. For example, each of the first side frame tube 160, central frame tube 162, and second side frame tube 164 are positioned within the clamping brackets 204, which mount the respective tubes to the second drive arm 148. In this embodiment, the clamping brackets 204 are each secured to the second drive arm 148.

Figure 6:
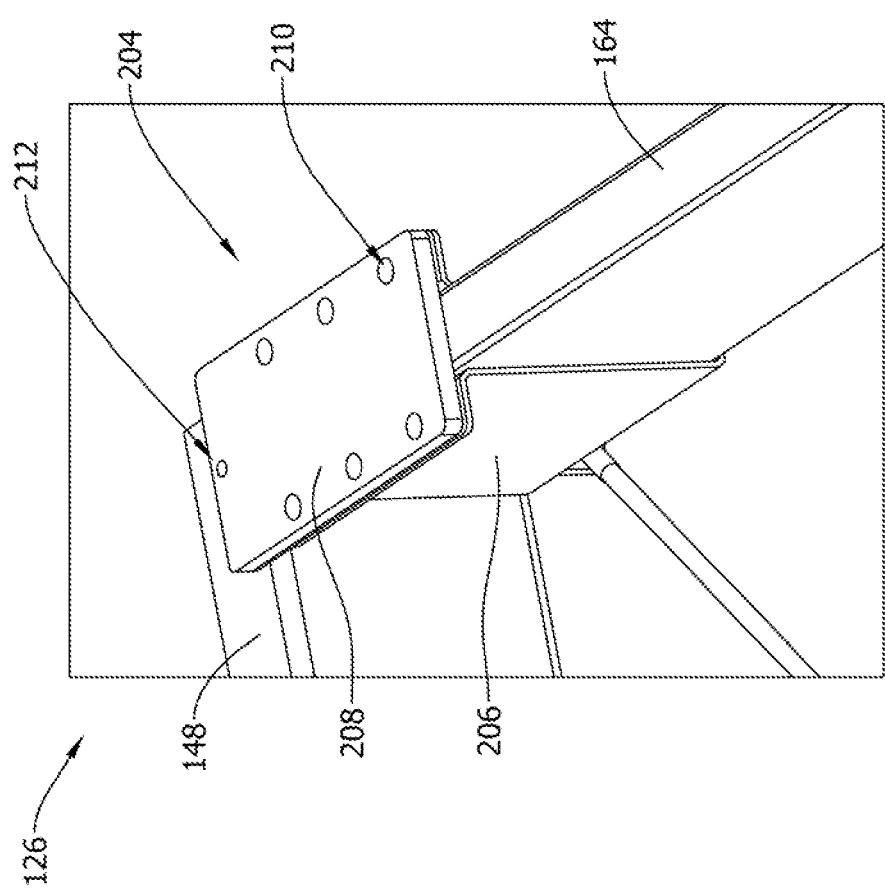
FIG. 6 is an enlarged perspective view of the drive and frame assembly of FIG. 5.

FIG. 6 is an enlarged view showing the clamping bracket 204 connecting the second side frame tube 164 to the second drive arm 148. As shown in FIG. 6, the clamping brackets 204 each include a C-bracket 206 and a plate 208. The C-bracket 206 is secured to the second drive arm 148 and receives a portion of the second side frame tube 164 therein. The plate 208 sits on the C-bracket 206 and defines a plurality of bracket apertures 210. The bracket apertures 210 are positionable in alignment with a plurality of apertures on the C-Bracket (not shown) for clamping the plate 208 to the C-bracket 206 and securing the second side frame tube 164 within the clamping bracket 204. The plate 208 further defines a mounting aperture 212. The mounting aperture 212 is positionable in alignment with a corresponding aperture (not shown) defined in the second drive arm 148 for fastening the clamping bracket 204 to the second drive arm 148. Each of the clamping brackets 204 of the frame assembly 126 (e.g., the clamping brackets on each of the drive arms and H-tubes) are substantially identical to the clamping bracket 204 shown in FIG. 6.

FIG. 7 is an enlarged view showing the first H-tube 150 of the second row section 120 (shown in FIG. 4). The H-tube 150 is rotatably coupled to the post 124 by a bushing assembly 214 such that the H-tube 150 may rotate within the bushing assembly 214 about the longitudinal axis 108 (shown in FIG. 1). The H-tube 150 is further connected to each of the first frame section and second frame sections 140, 142 to enable conjoint rotation of the frame sections 140, 142 with the H-tube 150 when the drive 116 is actuated.

Referring to FIG. 7, the H-tube 150 includes a first arm 216, a second arm 218, and first and second connecting blocks 220, 222 each extending between the first arm 216 and the second arm 218. In the illustrated embodiment, first arm 216, second arm 218, and first and second connecting blocks 220, 222 are each fixedly attached to one another by welding, though in other embodiments, any one of the arms and connecting blocks may be removably connected (e.g., via fastening). In this embodiment, each of the first arm 216, second arm 218, and first and second connecting blocks 220, 222 are hollow, though they may be made otherwise.

The first arm 216 extends outward from the post 124 in a lateral direction perpendicular to the longitudinal axis 108 to a first distal end 224. Clamping brackets 228 attach each of the frame tubes 160-170 to the H-tube 150. Specifically, the first arm 216 is attached to the first side frame tube 160 of the first frame section 140 and the first side frame tube 166 of the second frame section 142 at the first distal end 224. The central frame tube 162 of the first frame section 140 is further attached to the first arm 216. The second arm 218 extends outward from the post 124 in the lateral direction to a second distal end 226. The second arm 218 is attached to the second frame side tube 164 of the first frame section 140 and the second frame side tube 170 of the second frame section 142 at the second distal end 226. The central frame tube 168 of the second frame section 142 is attached to the second arm 218. The clamping brackets 228 are suitably identical to the clamping bracket 204 (shown in FIG. 6) and are each attached to the first H-tube 150. The first and second side frame tubes 160, 164, 166, 170 each extend longitudinally from the respective distal ends 224, 226 of the arms 216, 218 of the first H-tube 150 to the adjacent arms of the drive 116 and the second H-tube 152 (shown in FIG. 4).

Figure 8:
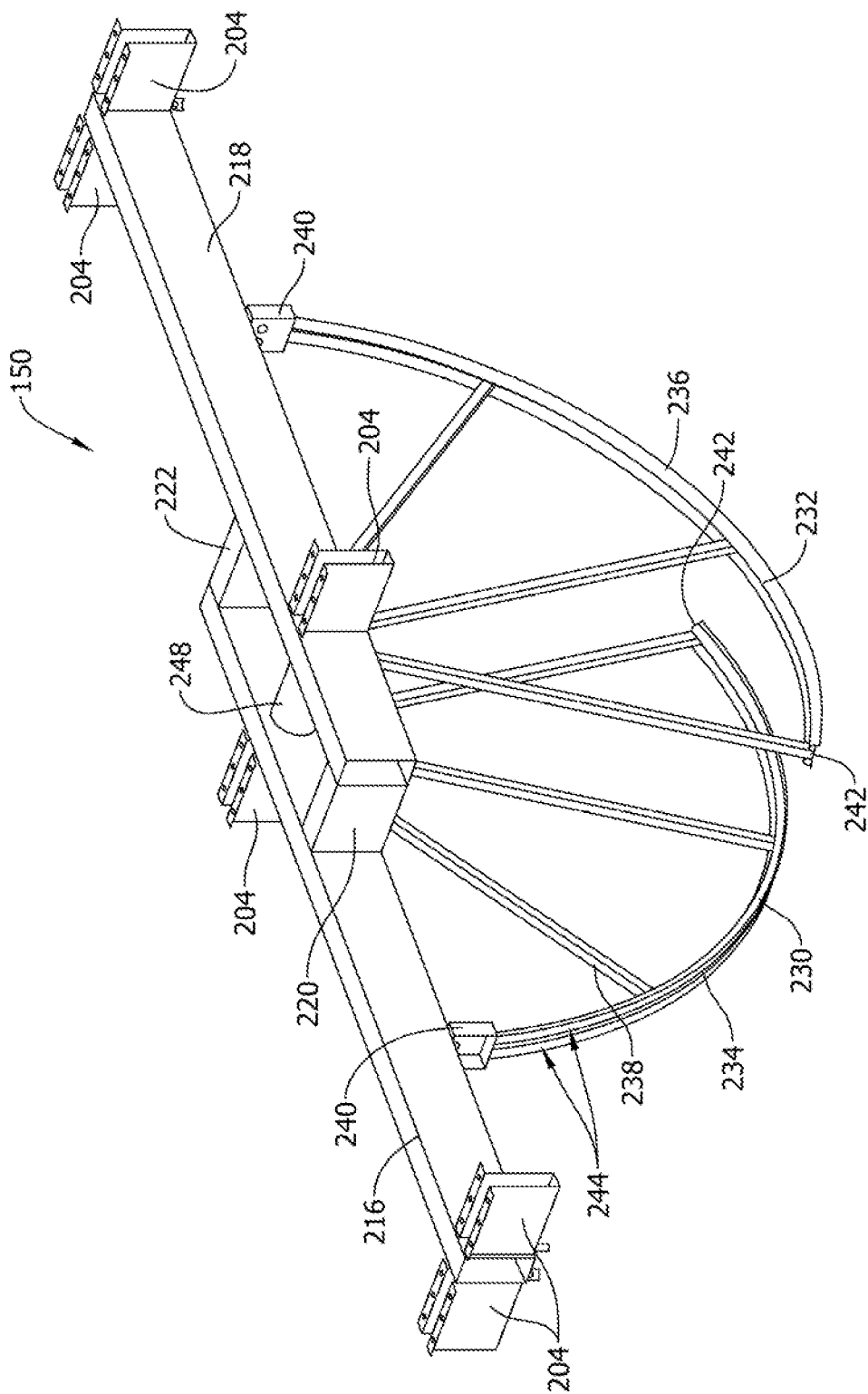
FIG. 8 is a perspective view of the H-tube of FIG. 7.

FIG. 8 shows a perspective view of the H-tube 150 shown in FIG. 7. As shown in FIG. 8, the H-tube 150 includes a first flywheel 230 mounted to the first arm 216 and a second flywheel 232 mounted to the second arm 218. The flywheels 230, 232 each include a peripheral section 234 and a plurality of spokes 238 connecting the peripheral section 234 to the respective first and second arms 216, 218. The peripheral section 234 is generally semicircular or "quarter circular" shaped and extends along an arc from a cable mount 240 attached to the respective arms 216, 218, to a distal end 242. In other embodiments, the peripheral section 234 may have another suitable shape, such as a semi-elliptical shape, and/or may extend linearly. The peripheral section 234 further defines a pair of cable grooves 244 therein. As described in greater detail below, the cable grooves 244 facilitate guiding cables (not shown) along the arc of the peripheral section 234 to the cable mounts 240.

Referring to FIG. 8, the first arm 216, second arm 218, first connecting block 220, and second connecting block 222 collectively define a central opening 246 of the H-tube 150 therebetween. The H-tube 150 further includes a spindle tube 248 extending across the central opening 246 from the first arm 216 to the second arm 218. The spindle tube 248 is sized to be received within the bushing assembly 214 (shown in FIG. 7) for mounting the H-tube 150 on the post 124 (shown in FIG. 7). In the embodiment of FIG. 8, the spindle tube 248 is fixedly attached to the first arm 216 and second arm 218. In some embodiments, the spindle tube 248 may be unitarily formed with the first arm 216 and the second arm 218. In other embodiments, the spindle tube 248 may be removably attachable to either one of the first arm 216 or the second arm 218.

Figure 9:
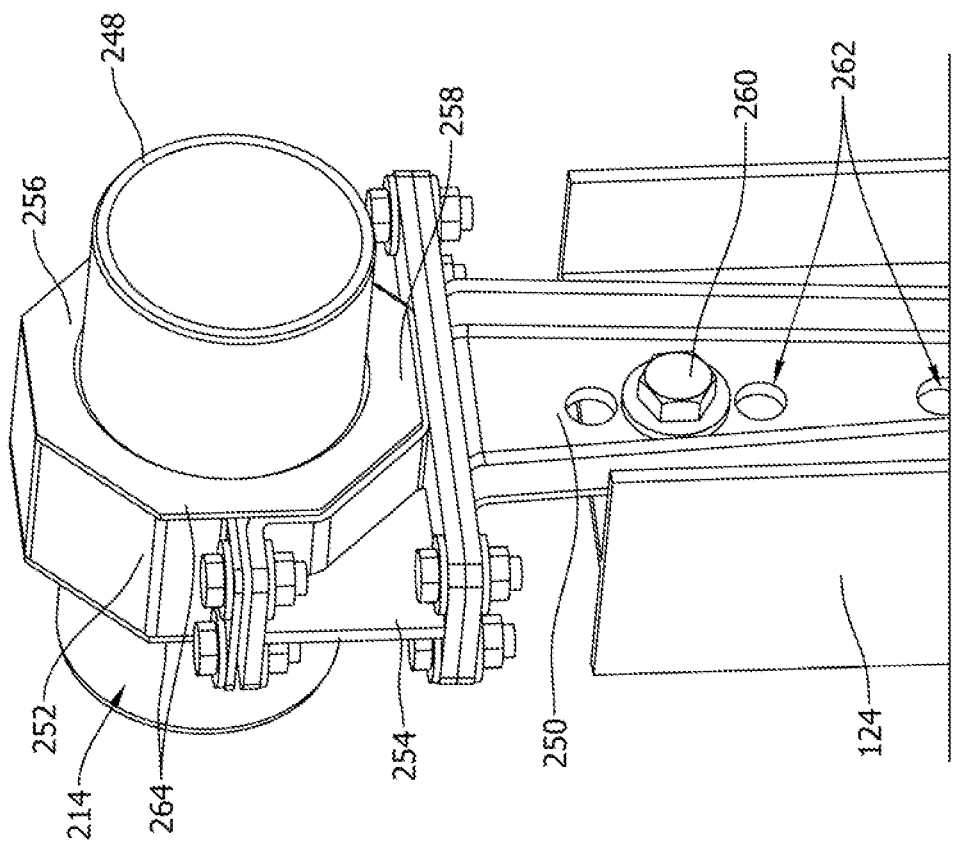
FIG. 9 is a perspective view of a bushing assembly and post of the solar array row of FIG. 4.

FIG. 9 shows an enlarged view of the post 124 and bushing assembly 214 of FIG. 7 and including the spindle 248 of the H-tube 150. The remaining portions of the frame assembly are removed to reveal the construction of the bushing assembly 214. Referring to FIG. 9, the bushing assembly 214 includes a bushing bracket 250, a first plumber block 252, a second plumber block 254, a first bushing case 256, and a second bushing case 258. The bushing bracket 250 is attached to the post 124 and supports the first plumber block 252 and the second plumber block 254 on the post 124. In particular, the second plumber block 254 is attached to the bushing bracket 250 and the first plumber block 252 is attached to the second plumber block 254. The bushing bracket 250 is attached the post 124 by a fastener 260 that extends through the post 124 and the bushing bracket 250. The bushing bracket 250 defines a plurality of apertures 262 vertically spaced on the bushing bracket 250 and each sized to receive the fastener 260 therethrough. An extension distance of the bushing bracket 250 from the post 124 may be selectively adjusted by aligning a different one of the apertures 262 with the corresponding aperture (not shown) in the post 124.

The first plumber block 252 and the second plumber block 254 collectively define a bushing opening (not shown) which receives the first bushing case 256 and the second bushing case 258 therein. The first bushing case 256 and the second bushing case 258 collectively define a hexagonal profile that corresponds to a hexagonal profile of the bushing opening. As a result, the plumber blocks 252, 254 inhibit rotation of the bushing cases 256, 258 within the bushing opening during rotation of the spindle tube 248. In the illustrated embodiment, the first bushing case 256 and the second bushing case 258 are each suitably made of a polymer material, such as nylon for example. The bushing cases 256, 258 provide a cushioned interference with the spindle tube 248 and act as a damper on the frame assembly 126. In other embodiments, the bushing cases 256, 258 may be formed of any suitable material.

Figure 10:
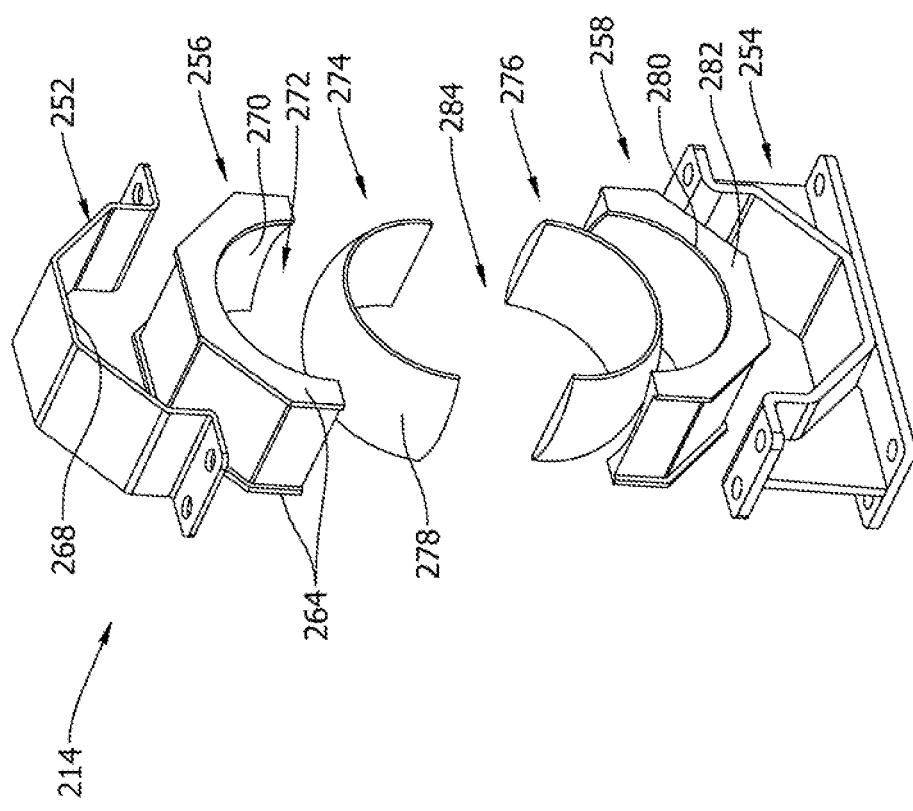
FIG. 10 is an exploded view of the bushing assembly of FIG. 9.

Referring to FIGS. 9 and 10, each of the bushing cases 256, 258 includes a flanged outer wall 264 that extends longitudinally outside of the plumber blocks 252, 254 and engages side edges 268 of the plumber blocks 252, 254 to secure the bushing cases 256, 258 within the plumber blocks 252, 254. Bushing cases 256, 258 each further include concave inner surfaces 270. Referring to FIG. 10, the first bushing case 256 and the second bushing case 258 collectively define a case opening 272 that receives a first bushing 274 and a second bushing 276 therein. In particular, the inner surfaces 270 of the bushing cases 256, 258 are contoured in correspondence with a convex contour of exterior surfaces 278 of the first bushing 274 and the second bushing 276. The bushings 274, 276 are positioned between the bushing cases 256, 258 such that the outer surfaces 278 of the bushings 274, 276 contact the inner surfaces 270 of the bushing cases 256, 258. The bushing cases 256, 258 each further include outer lips 280 on side walls 282 on both sides of the bushing cases 256, 258. The lips 280 extend radially inward beyond the inner surfaces 270 to retain the bushings 274, 276 within the bushing cases 256, 258. As a result, the bushings 274, 276 may be retained at different angles within the bushing cases 256, 258, which facilitates installing the solar tracker row 102 on inclined surfaces, such as a hill. For example, the solar tracker may be positioned on a ground surface having an incline of at least 10 degrees, 20 degrees, or 30 degrees while still enabling the bushing assembly 214 to function as described herein.

The bushings 274, 276 define a spindle opening 284 therebetween that receives the spindle tube 248 (shown in FIG. 9). The first bushing 274 and second bushing 276 form a two-piece bushing that is separable for receiving the spindle tube 248 (shown in FIG. 9) within the spindle opening 284 during assembly. During use, the spindle tube 248 may freely rotate within the bushing cases 256, 258 while oscillations of the spindle tube 248 are at least partially damped by the interface between the bushings 274, 276 and the bushing cases 256, 258. In the illustrated embodiment, the first and second bushings 274, 276 are each made of a polymer material, though other suitable materials may also be used.

During assembly, the spindle tube 248 may be mounted on the post 124 by placing the spindle tube 248 on the second bushing 276 and subsequently overlaying the first bushing 274, the first bushing case 256, and the first plumber block 252 on the spindle tube 248. The first plumber block 252 is then fastened to the second plumber block 254 to clamp the spindle tube 248 within the bushing assembly 214.

Thus, the two-piece construction of each of the plumber blocks 252, 254, the bushing cases 256, 258, and the bushings 274, 276, enable a quick mounting of the H-tubes on the bearing assemblies. In other embodiments, one or more of the bushing cases 256, 258 and/or the bushings 274, 276 may include one or more locking features (not shown) to securely join the two-piece structures. For example, and without limitation, in some embodiments the second bushing 276 may include a projection, a snap, and/or clamp, which engages the first bushing 274.

Figure 11A:
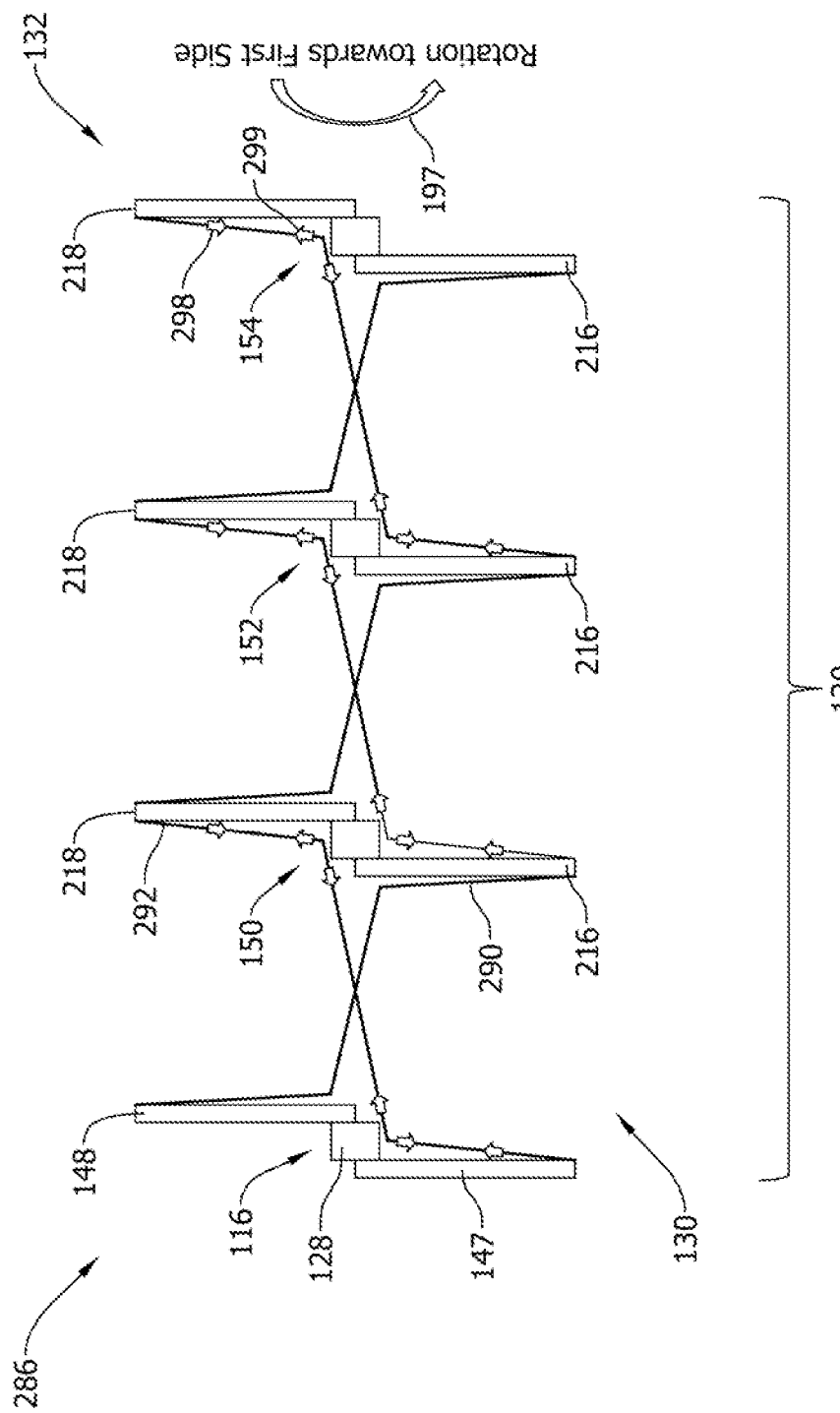
FIG. 11A is a schematic view of a cable tensioning system of the portion of the solar array row of FIG. 4, showing torsional loading on the row in a first direction.

Referring back to FIG. 4, the solar array row 102 of the example embodiment further includes a cable tensioning system 286 for damping torsional loads on the solar array. The cable tensioning system 286 includes a crossing network of cables 288 which connect opposite arms (e.g., drive arms and H-tube arms) of the frame assembly 126. FIG. 11A is a schematic view of the second row section 120 shown in FIG. 4 showing portions of the H-tube and schematically illustrating the cables of the cable tensioning system 286. Specifically, the cables of the cable tensioning system 286 have an exaggerated thickness in the view of FIG. 11A to highlight paths of the cables. The cables of the cable tensioning system 286 include a plurality of first cables 290 and a plurality of second cables 292. The first and second cables are arranged on the mounting assembly 122 to cross one another and to each extend to a laterally opposed arm and adjacent H-tube and/or drive. The first and second cables are each provided in tension on the mounting assembly 122 to generate a damping resistance or "restraining" force for damping torsional loads on the row 102, such as loads resulting from wind induced vibrations of the row 102. In the example embodiment, the cables each include tensioning devices, such as turnbuckle 295 (shown in FIG. 7) that allows for selectively adjusting the tension in the cables.

Still referring to FIG. 11A, a first cable 290 is attached to the second drive arm 148 and extends to the first arm 216 of the first H-tube 150. A second cable 292 is attached to the first drive arm 147 and extends to the second arm 218 of the first H-tube 150. Thus, the first cable 290 and the second cable 292 cross one another between the drive 116 and the first H-tube 150. Similarly, another first cable 290 is attached to the second arm 218 of the first H-tube 150 and extends to the first arm 216 of the second H-tube 152. Another second cable 292 is attached to the first arm 216 of the first H-tube 150 and extends to the second arm 218 of the second H-tube 152. Additionally, another first cable 290 is attached to the second arm 218 of the second H-tube 152 and extends to the first arm 216 of the third H-tube 154. Finally, another second cable 292 is attached to the first arm 216 of the second H-tube 152 and extends to the second arm 218 of the third H-tube 154.

As also shown in FIG. 11A, the network of the first and second cables 290, 292 transfer torsional loads applied on the row 102 from wind induced vibrations to the central post 128. The cables 290, 292 act as a static support for the each of the arms 216, 218 to restrain oscillations or rapid vibration of the arms 216, 218 and prevent torsional instabilities in the row 102. For example, since each cable on a given arm extends to a laterally opposed arm on an adjacent H-tube and/or drive, any torsional loads experienced at one side of the row 102 are translated by the cables to the other side of the row 102, and ultimately to the center post 128. At least partially due to the arms being freely rotatable within the bushing assemblies, the cables direct torsional loads on the row 102 back to the drive 116 on the center post 128, which is not freely rotatable. In particular, the drive 116 at the center post 128 provides restraint against rotation of the arms in response to torsional loading on the arms, thereby balancing the torsional loads on the row 102. The balancing of torsional loads by the cables dampens vibrations on the row 102 to prevent torsional instabilities, such as wind induced vibrations, that may deteriorate or damage components of the solar array row 102. In the example embodiment the solar array row 102 is over damped, though in other embodiments it may be critically damped or under damped For example, as shown in FIG. 11A, a torsional force in a first direction 197 is applied on the third H-tube 154 of the row 102. The first direction 197 is towards the first side 130 (i.e., in the counter-clockwise direction of FIG. 3). The torsional force is transferred through tension (shown schematically in FIG. 11A by force vector arrows 298) in the second cables 292. In particular, the torsional force provides a lifting force on the second arm 218 of the third H-tube 154, which is transferred to the first arm of the second H-tube through tension in the second cable 292. The tension in the second cable 292 provides a force pulling down the first arm 216 of second H-tube 152, which is translated through second H-tube 152 to second arm 218 of second H-tube 152, pulling the second arm 218 up. The force is similarly transferred to the first H-tube 150, and ultimately to drive 116 in substantially the same manner. When the drive 116 is locked in position, the drive 116 provides a substantially opposite force in the second cables 292, which is translated to each of the arms to restrain rotation of the arms. The second cables 292 each transfer the torsional force to the central post 128, or more particularly, to the drive 116. The second cables 292 further transfer the restraining force provided by the drive 116 to each of the arms, thereby restraining rotation of each of the arms and balancing the torsional loading on the arms. As shown in FIG. 11A, the tension in the second cables 292 provided by the torsional force and the corresponding restraining force provided by drive 116 are represented by opposite direction force vector arrows 298.

Although the cables 290, 292 are each shown as continuous single-piece cables in the schematic of FIG. 11A, in some embodiments the cables 290, 292 include one or more cable sections which are connected together. For example, as shown in FIG. 7, the cables 290, 292 each include a turnbuckle 295, or more broadly, a cable connector, that connect cable sections 291, 293 of the cables 290, 292. The turnbuckle 295 engages the opposed cable sections 291, 293 of one of the respective cables 290, 292 and is operable to adjust the tension in the cables 290, 292 by adjusting a position of the respective cable sections 291, 293 in the turnbuckle 295.

Figure 11B:
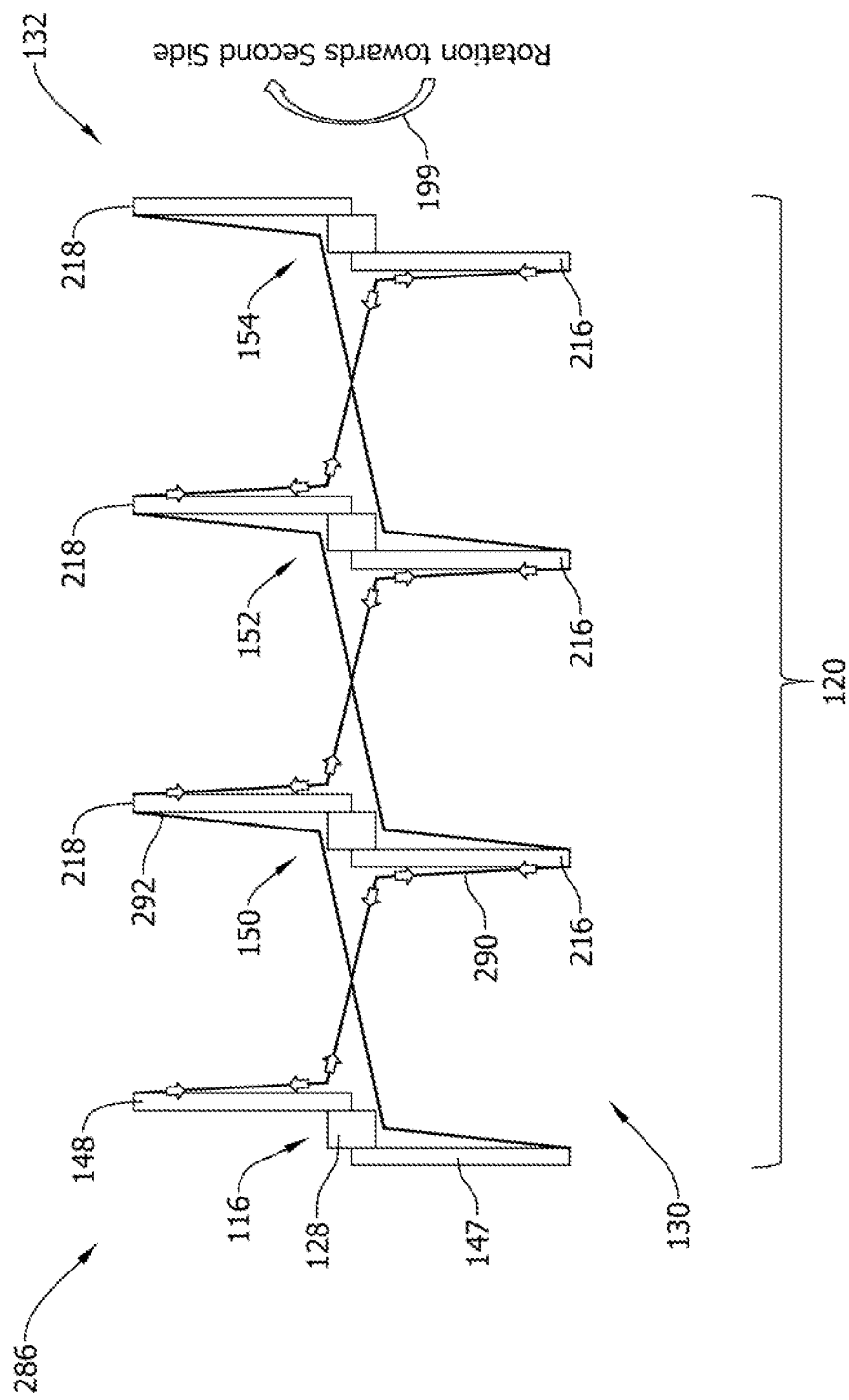
FIG. 11B is another schematic view of the cable tensioning system of FIG. 11A, showing torsional loading on the row in a second direction.

Referring to FIG. 11B, when a torsional force is applied on the row 102 in a second direction 199 opposite the first direction 197 (i.e., rotating the arms towards the second side 132 in the clockwise direction of FIG. 3), the force is transferred by the first cables 290 from each of the arms to the central post 128. In particular, the first cables 290 transfer the torsional force from the arms to the drive 116 and/or central post 128 and the drive 116 provides a substantially equal and opposite restraining force by the first cables 290 to restrain rotation of the arms towards the second side 132. Moreover, the cables, arms, and H-tubes transfer the sum of torsional loading on the row 102 to the center post 128. For example, where each of the second arms 218 experiences one kilonewton of torsional loading, the cables transfer the torsional loading from each of the second arms 218 to the center post 128, such that the center post 128 receives the total three kilonewtons of torsional loading from the three second arms 218.

The cable tensioning system 286 improves stability of the solar array row 102 and enables a reduced weight of the row 102. As an example, in an embodiment of the disclosure that does not include the cable tensioning system 286, wind induced torsion and/or twists on the three H-tubes 150, 152, 154 and corresponding arms would pass through the frame sections 140, 142, 144, 146 (shown in FIG. 4), and/or a torque tube (not shown) to the central post 128 as torsion. As a result, the frame sections 140, 142, 144, 146, or more specifically the frame tubes of the frame section, would be subjected to large torsional loads, which may damage the frame tubes and/or require heavier frame tubes to withstand the torsional loading. In contrast, the cable tensioning system 286 of the present disclosure directs torsional loads on the row 102 through the cables 290, 292 along the length of the cable and to the center post 128. As a result, the torsional loads are directed through the cables 290, 292 and not the frame tubes, thereby providing improved stability to the row 102 and allowing for a reduced overall weight of the frame assembly and/or the frame sections. Moreover, because the cable tensioning system 286 translates the torsional loads instantaneously, the cable tensioning system 286 provides an improved dynamic response to vibrations as compared with some known dampers, such as hydraulic or pneumatic dampers or shock absorbers. In particular, the cables 290, 292 increases the natural frequency of the row 102 by providing an increased stiffness to the row 102, thereby making it less susceptible to wind induced vibrations.

Although not illustrated, the cable tensioning system 286 similarly extends through the first row section 118 in substantially the same manner as described with respect to the second row section 120. The first and second cables 290, 292 are each made of steel, though the cables may be formed of any suitable material in alternative embodiments. Moreover, in some embodiments, the cable tensioning system 286 may include only two cables or, even only a single continuous cable which collectively winds through the combined paths of the separate cables as shown in FIG. 11. For example, the first cable 290 extending from the second drive arm 148 to the first arm 216 of the first H-tube 150 and the second cable 292 extending from the first arm 216 of the first H-tube 150 to the second arm 218 of the second H-tube 152 may include only a single cable.

In other embodiments, the cable tensioning system may also include a cable detection system (not shown) for detecting a condition of each of the cables. For example, in such embodiments, an electrical signal is generated at a first end of one of the cables 290, 292 by a signal generation device (not shown). A controller, such as the row controller or a separate controller, is electrically coupled to the respect cable 290, 292 and operable to detect the signal generated by the signal generation device. In one example, the signal generation device is positioned proximate the ends 104, 106 (shown in FIG. 1) of the row 102 and is attached to the third H-tube 154. One or more of the cables 290, 292 running between the drive arm 148 and the fourth H-tube are electrically connected to one another such that an electrical signal generated in the one of the cables 290, 292 at the third H-tube 154 travels back to drive arm 148 and is detected by the controller during a normal condition of the tracker system 100. If one or more of the cables 290, 292 degrades, or breaks entirely, the electrical signal does not reach the controller and the controller detects that a fault with one of the cables 290, 292 has occurred. The controller may generate and transmit an alert and/or alter control of the tracker system 100 in response to detecting the cable fault.

Figure 12:
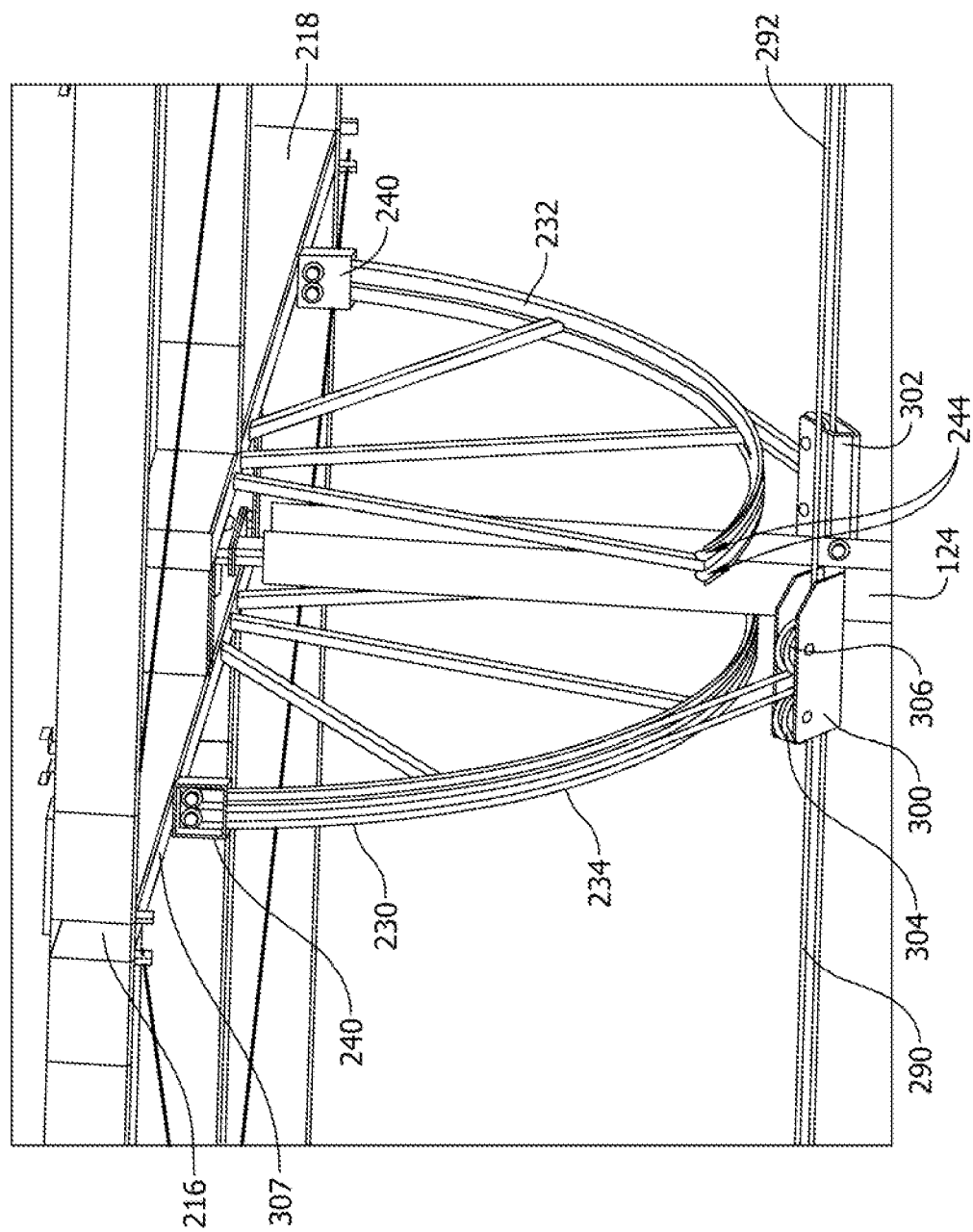
FIG. 12 is a bottom perspective view of the H-tube and the portion of the frame assembly of FIG. 7.

FIG. 12 shows a bottom perspective view of the first H-tube 150 shown in FIG. 7. A first pulley bracket 300 and second pulley bracket 302 are mounted on opposed sides of the post 124. The pulley brackets are each positioned at least partially longitudinally offset from the posts 124 and in alignment with the first and second flywheels 230, 232, respectively. Each of the brackets 300, 302 includes a pair of pulleys 304, 306 for receiving one of the first and second cables 290, 292, respectively. In particular, the pulleys 304, 306 provide a tangential interface to the cables 290, 292 to guide the cables 290, 292 from the longitudinal direction to a direction tangential to the peripheral sections of the flywheels 230, 232. The cable grooves 244 each receive the first and second cables 290, 292 therein from the pulleys 304, 306 and guide the cables 290, 292 along the arced peripheral section of the flywheels 230, 232 to the cable mounts 240 of the first and second arms 216, 218. As shown in FIG. 12, the cables 290, 292 are each fastened to the cable mounts 240 at a position proximate the first and second arms 216, 218. In particular, the cable mounts 240 are each mounted to a lower surface 307 of the respective arms 216, 218. In other embodiments, the cables 290, 292 may be mounted to the respective arms 216, 218 in any suitable arrangement.

At least in part due to the configuration of the cable tensioning system 286, the solar array row 102 of the present disclosure is able to dampen torsional loads applied on the row 102 without the use of separate damping assemblies, such as shock absorbers, hydraulic or pneumatic dampers, linear actuators, etc. In other words, the system is free of hydraulic and pneumatic dampers and linear actuators. Also, the configuration of the cable tensioning system 286 and the tie-rod 188, 190 and cross tubes 184, 186 (shown in FIG. 4) provides separate reinforcements for different loads applied on the row 102. For example, the tie-rod 188, 190 and cross tubes 184, 186 provide reinforcement against bending loads while the cable tensioning system 286 provides reinforcement against torsional loads. Moreover, the construction of the three frame tubes also reinforces the frame assembly 126 against bending loads, while providing locations for mounting the panel assemblies 110. As a result, unlike at least some solar tracker systems which include a central torque tube and cantilevered mounting rails that extend laterally from the torque tube, the solar tracker system 100 of the present disclosure does not include any cantilevered rails off the central frame tube. That is, the frame assembly is free of cantilevered lateral rails.

Figure 13:
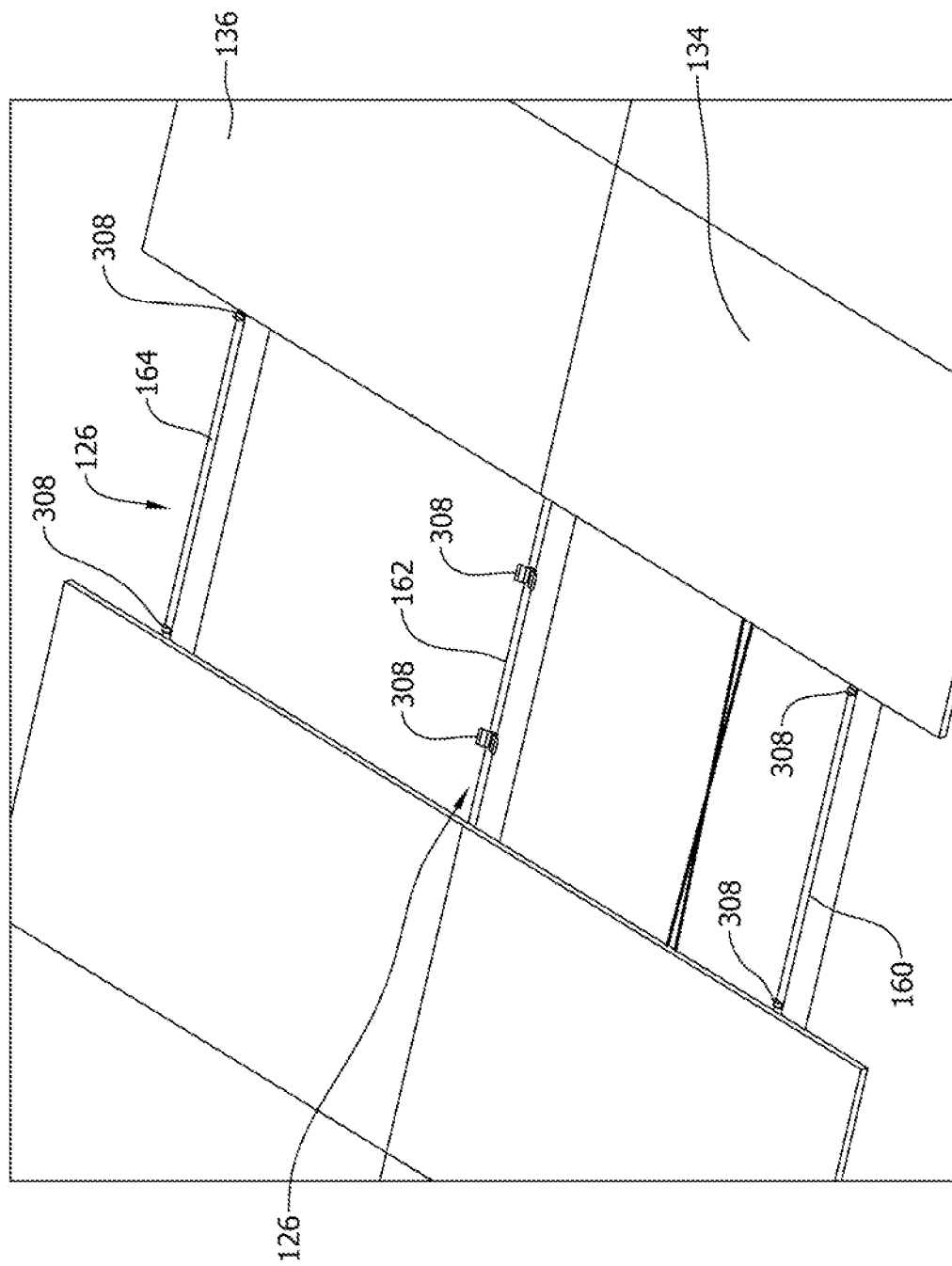
FIG. 13 is a perspective view of a portion of the solar array row of FIG. 1, with a pair of solar panel assemblies removed to reveal construction of the frame assembly.

FIG. 13 shows an enlarged view of a portion of the solar row 102 shown in FIG. 1, with two panel assemblies 134, 136 removed to reveal construction of the frame assembly 126. As shown in FIG. 13, each of the first side frame tube 160, the second side frame tube 164, and the central frame tube 162 includes a plurality of panel clips 308 for releasably attaching the panel assemblies 134, 136 to the frame assembly 126. Each of the panel assemblies 134, 136 is secured to the frame assembly 126 by four panel clips 308 in this embodiment.

Each of the panel clips 308 engages at least two adjacent panel assemblies, apart from the panel clips 308 provided at the ends of the row 102 and adjacent the drive 116 (shown in FIG. 1). For example, the panel clips 308 on the first side frame tube 160 and the second side frame tube 164 each engage longitudinally adjacent panel assemblies 134, 136, while the clips on the central frame tube 162 each engage laterally adjacent panel assemblies 134, 136 (i.e., adjacent first and second panel assemblies 134, 136). The panel clips 308 are each securely fastened to one of the frame tubes 160, 162, 164 and are oriented to receive the adjacent panel assemblies 134, 136. The panel clips 308 on the first and second side frame tubes 160, 164 are oriented in substantially the same manner, while the panel clips 308 on the central frame tube 162 are rotated approximately 90 degrees from the orientation of panel clips 308 on the first and second side frame tube 160, 164.

Figure 14:
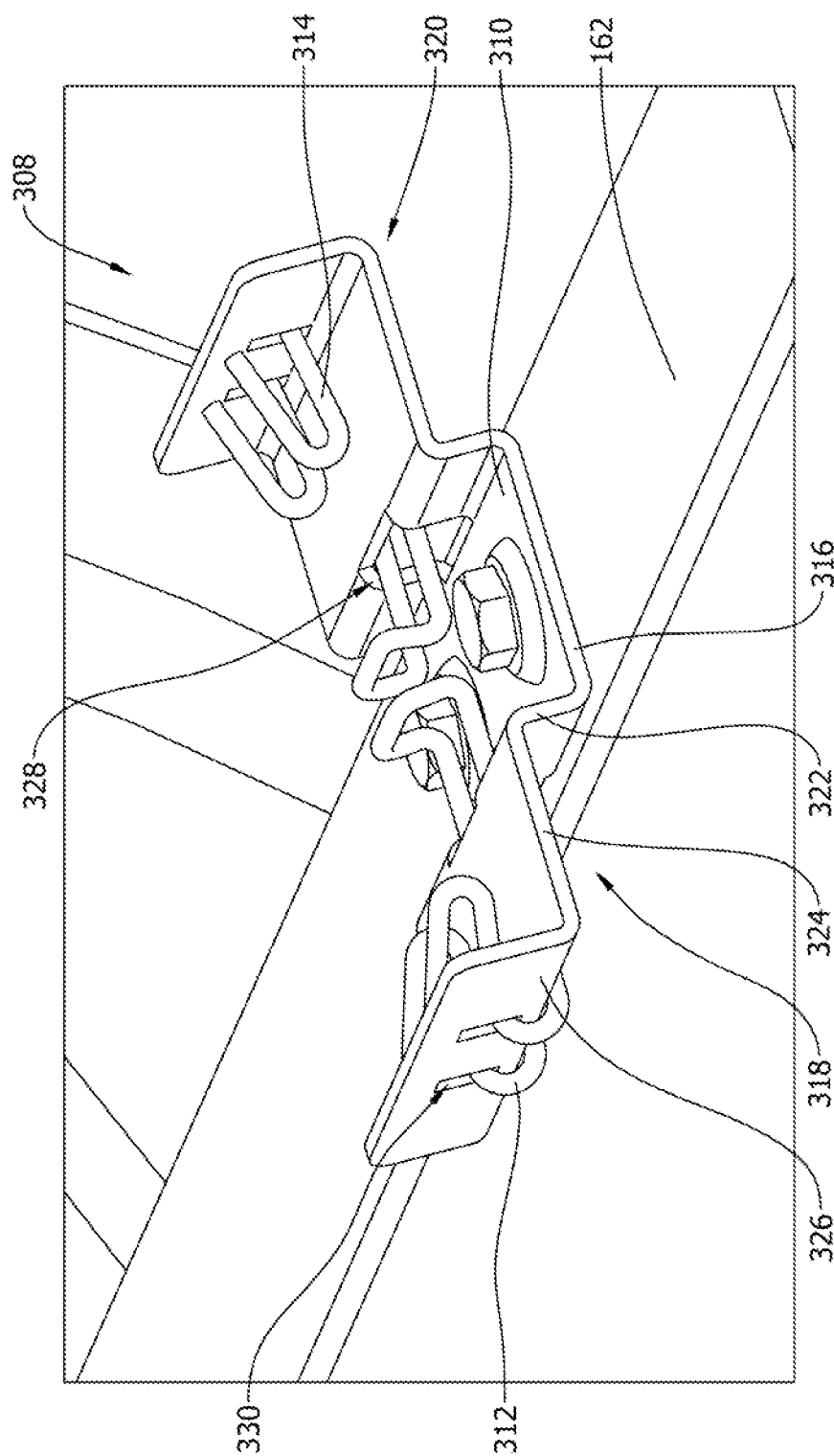
FIG. 14 is an enlarged view of the portion of the solar array row of FIG. 13 showing a panel clip mounted on the frame assembly.
Figure 15:
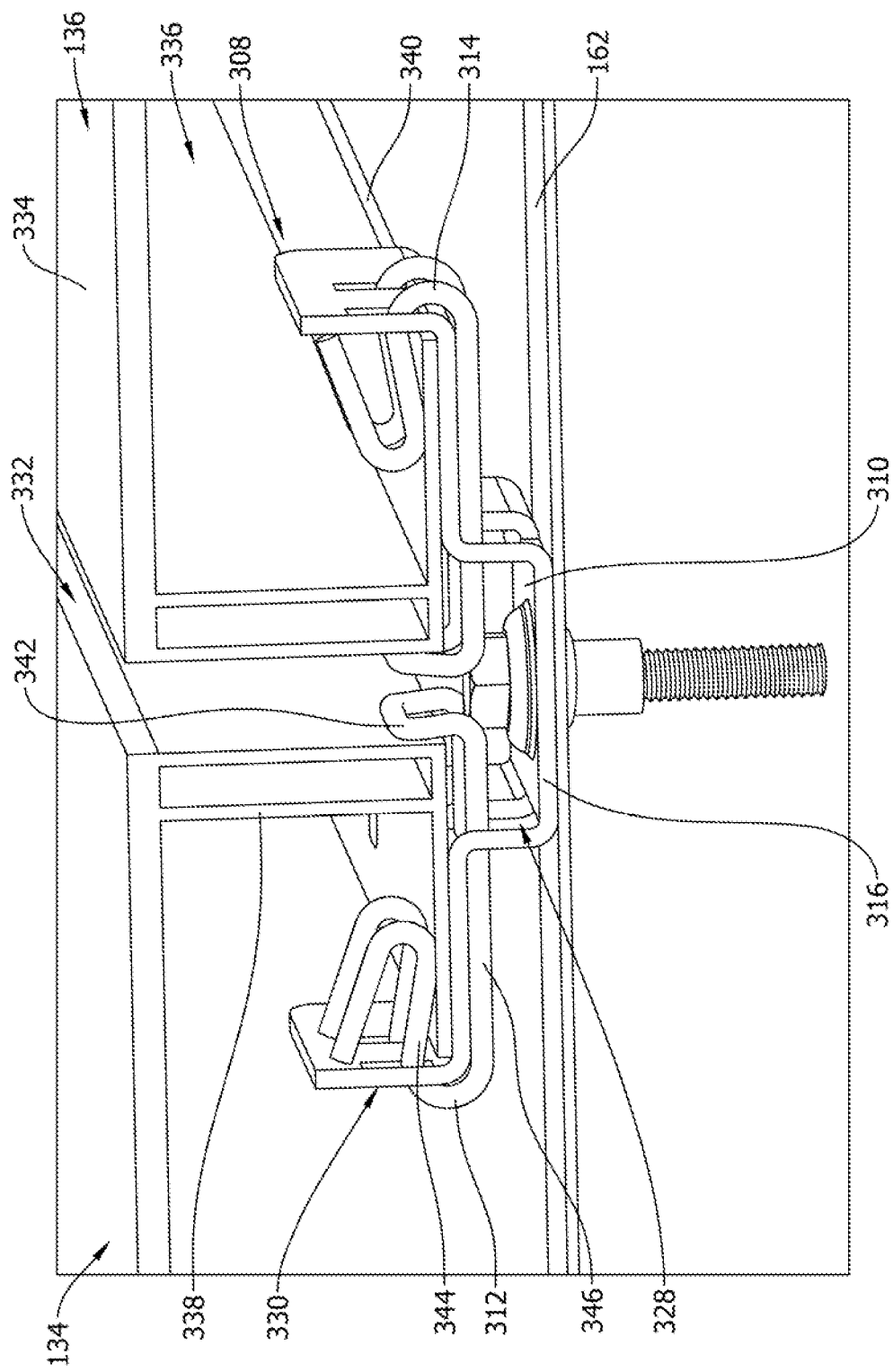
FIG. 15 is a section view of the portion of the solar array row of FIG. 14 showing the panel clip engaged with the solar panel assemblies.

Referring to FIG. 14, a panel clip 308 mounted to the central frame tube 162 is shown. The panel clip 308 includes a clamp 310 and a pair of hooks 312, 314 connected to the clamp 310. The hooks 312, 314 are removably connected to the clamps 310 and engage the panel assemblies 134, 136 (e.g., as shown in FIG. 15). The clamp 310 includes a central portion 316 and two wings 318, 320 extending laterally outward from the central portion 316. The central portion 316 is fastened to the central frame tube 162. The panel clip 308 is substantially symmetrical about the about the central portion 316.

The wings 318, 320 of the clamp 310 each include a first side wall 322, an intermediate side wall 324, and a second side wall 326. The first side walls 322 extend laterally (e.g., in the vertically in FIG. 14) from the central portion 316 to the intermediate side walls 324. The intermediate side walls 324 extend laterally from the first side wall 322 and outward from the central frame tube 162 to the second side walls 326. The second side walls 326 extend laterally from the intermediate side walls 324. The first side wall 322 defines a first opening 328 that extends through the first side wall 322 and the second side wall 326 defines a pair of second openings 330 that each extend through the second side walls 326. The openings 330 are sized to receive the first and second hooks 312, 314 respectively therethrough. Further, each of the panel clips 308 of the solar array row 102 are substantially identical to the panel clip 308 described with respect to FIG. 14 in this example.

FIG. 15 shows a cross sectional view of the panel clip 308 of FIG. 14 engaged with the first and second panel assemblies 134, 136 shown in FIG. 13. As shown in FIG. 15, the first and second panel assemblies 134, 136 are each mounted to the central frame tube 162 such that a gap 332 is defined between panel assemblies 134, 136. The gap 332 is defined in alignment with the central portion 316 of the clamp 310.

The panel assemblies 134, 136 each include a solar panel 334 and a panel frame 336 extending from the solar panel 334. The panel frame 336 includes a frame side wall 338 extending laterally (e.g., vertically downward in FIG. 15) from the panel 334 and a lip 340. In the embodiment of FIG. 15 the frame side wall 338 is generally hollow, though in other embodiments the frame side wall 338 may have a solid construction. The lip 340 extends laterally outward from the frame sidewall 338 and inward of the panel assembly 134, 136. The frame side wall 338 and the lip 340 extend around an entire perimeter of the panel assemblies 134, 136.

As shown in FIG. 15, the hooks 312, 314 each include a head 342, pair of legs 344, and body sections 346 extending between the head 342 and the pair of legs 344. The legs 344 extend through the second openings 330 in the clamp 310 and the head 342 and portions of the body sections 346 extend through the first openings 328. The heads 342 of the hooks 312, 314 each extend into the gap 332 defined between the panel assemblies 134, 136 and engage respective frame side walls 338 of the first and second panel assemblies 134, 136. The legs 344 extend at least partially downward through the openings 330 and contact the respective lips 340 of the first and second panel assemblies 134, 136.

During assembly, the panel assemblies 134, 136 may be installed on the frame assembly 126 without the use of any separate tooling. For example, to install the panel assemblies 134, 136 on the frame assembly 126, the first panel assembly 134 and second panel assembly 136 are each positioned on the intermediate side walls 324 (shown in FIG. 14) of the clamp 310. The head 342 of the clips 308 are then individually fed through the first and second openings 328, 330, respectively and moved toward the gap 332. Each of the legs 344 may be resiliently flexed inward to insert the legs 344 through the second openings 330 as the heads 342 are moved into the gap 332. After the legs 344 have cleared the second openings 330, the legs 344 flex back into the position shown in FIG. 15, thereby inhibiting lateral movement of the legs 344 back through the second openings 330.

The clamp 310 and hooks 312, 314 collectively restrict lateral movement of the first and second panel assemblies 134, 136. Moreover, the panel clips 308 secure the panel assemblies 134, 136 on the frame assemblies 126 without requiring any fasteners or tools. As a result, the panel clips 308 allow for a quick install of the panel assemblies 134, 136 on the frame assembly 126 and reduced disassembly time, during maintenance operations for example.

In some embodiments, the panel frame 336 further includes an anodized surface layer (not shown) and at least one of the clamp 310 and the hooks 312, 314 may include a scratching or de-anodizing feature (not shown), such as a rough surface. In such embodiments, when the panel assemblies 134, 136 are mounted on the panel clips 308, the scratching feature removes a portion of the anodized layer on the panel frame 336 to provide an electrical grounding path from the panel assemblies 134, 136 to the central frame tube 162.

Figure 16B:
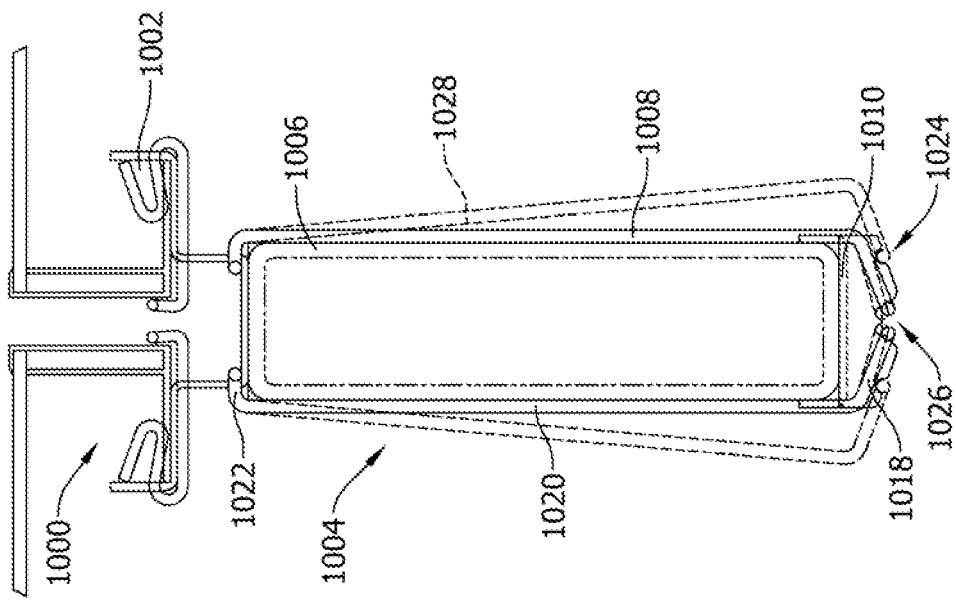
FIG. 16B is a section view of the portion of the solar array row of FIG. 16A.
Figure 16A:
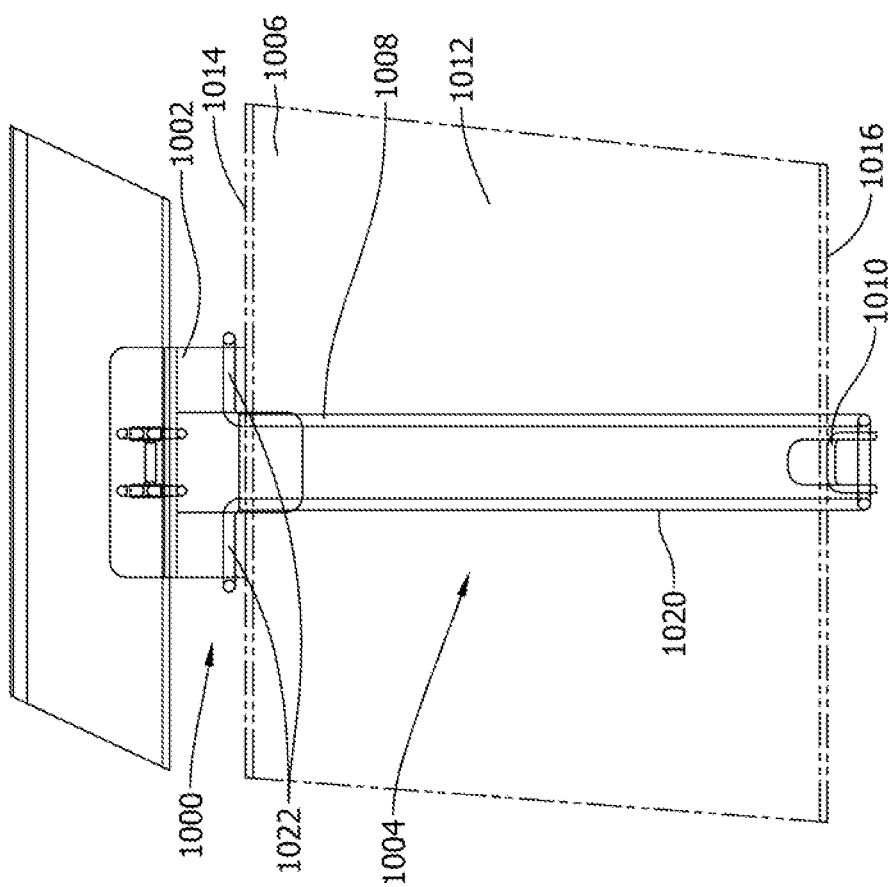
FIG. 16A is an enlarged front view of a portion of the solar array row of FIG. 13, showing an alternative clip assembly for mounting the panel assemblies on the frame assembly.

FIGS. 16A and 16B show an alternative clip assembly 1000 for mounting the panel assemblies on the frame assembly 126. The clip assembly 1000 of FIGS. 16A and 16B includes a panel clip 1002 and a releasable mounting assembly 1004 for releasably mounting the panel clip 1002 on a frame tube 1006. The panel clip 1002 of FIGS. 16A and 16B is substantially identical to the panel clip 308 shown in FIGS. 13-15, except that the alternative panel clip 1002 does not include a bolt fastening the panel clip 1002 to the frame assembly or central frame tube 1006. Rather, in the embodiment of FIGS. 16 and 16B, the panel clip 1002 is attached to the central frame tube 1006 by the releasable mounting assembly 1004.

The releasable mounting assembly 1004 includes a pair of spring clips 1008 (e.g., as shown in FIG. 16B) and a nest clamp 1010. The spring clips 1008 extend around opposed side walls 1012 of the central frame tube 1006 and from a first end wall 1014 of the frame tube 1006 to a second end wall 1016 of the frame tube 1006. The spring clips 1008 each include a head 1018, body sections 1020 extending from the head 1018, a pair of legs 1022 extending from the respective body sections 1020.

The spring clips 1008 secure the panel clip 1002 in position on the first end wall 1014 of the central frame tube 1006. The spring clips 1008 also engage the nest clamp 1010, which is seated on the second end wall 1016 of the central frame tube 1006. More specifically, the legs 1022 of the clips 1008 each extend through the opposed first openings of the clamp (shown in FIG. 15) and extend laterally therefrom along the first side walls of the clamp (shown in FIG. 14) to distal ends of the spring clip 1008. The body sections 1020 extend downward from the legs 1022 along the side walls 1012 of the central frame tube 1006 to the respective heads 1018 of the spring clips 1008. The heads 1018 each extend obliquely inward from the body sections 1020 and relative to the central frame tube 1006 to engage the nest clamp 1010.

Referring to FIG. 16B, the nest clamp 1010 defines a pair of outer spring grooves 1024 and an inner spring groove 1026. Moreover, spring clips 1008 are each moveable between an initial position 1028 (shown in broken lines) and a mounted position (shown in solid lines). In the initial position 1028, heads of the spring clips 1008 are each seated in the outer spring groove 1024. In the mounted position, heads 1018 of spring clips 1008 are each positioned in the inner spring groove 1026. When spring clips 1008 are moved to the mounting position, nest clamp 1010 and spring clips 1008 cooperatively clamp the releasable mounting assembly 1004 in position on the central frame tube 1006 and resist lateral movement (i.e., to the left or right of the page in FIG. 16A) of the releasable mounting assembly 1004 and the panel clip 1002.

FIG. 17 shows an alternative solar array row 1100 having an alternative frame assembly 1101. The alternative row 1100 is substantially the same as the solar array row 100 shown in FIGS. 1-16B, except as noted below. The panel assemblies and cable tensioning system are removed to reveal construction of the frame assembly 1101. The panel assemblies and cable tensioning system are not shown in FIG. 17 but are substantially similar to those shown in FIG. 4.

The solar array row 1100 is a one-panel or "1P" row (terms used interchangeably herein), in that it supports a single row of solar panel assemblies (e.g., similar to solar panel assemblies 110, shown in FIG. 1).

The frame assembly 1101 includes a first frame section 1102 and a second frame section 1104, a first side 1122 and a second side 1124. The frame sections 1102, 1104 are separated by H-tubes 1108, 1110, 1112 and/or drive arms (not shown). Each of the frame sections 1102, 1104 includes frame tubes that extend longitudinally along the row 1100. As shown in FIG. 17, the first frame section 1102 includes a first side frame tube 1114 and a second side frame tube 1116, each fastened to and extending longitudinally from the first H-tube 1108 to the second H-tube 1110. The second frame section 1104 includes a first side frame tube 1118 and a second side frame tube 1120, each fastened to and extending longitudinally from the second H-tube 1110 to the third H-tube 1112.

The frame assembly 1101 is configured for installation of panel assemblies (not shown) in a one-panel stack configuration, such that one panel is provided extending between the first side 1122 and the second side 1124 in a portrait orientation. Notably, the one-panel configuration of the frame assembly 1101 does not require the central frame tube as depicted in FIG. 4.

FIG. 18 shows an enlarged view showing the first H-tube 1108 of the row 1100 shown in FIG. 17. The first H-tube 1108 rotatably coupled to a post 1124 in a configuration as described in FIG. 7. Because the frame assembly 1101 is for a one-panel stack configuration, there is no central frame tube, and clamping brackets (not shown) are only needed at distal ends 1126, 1128.

The cross tubes 1114, 1116 and H-frame 1108 are shown with a rectangular cross section, however, in other possible embodiments, the cross section may be circular or any other acceptable configuration.

The panel assemblies (not shown) are mounted onto the frame assembly 1101 with clips (not shown) similar to the clips shown in FIG. 13. The clips are attached to the cross tubes 1114, 1116 which releasably attach the panel assemblies to the frame assembly 1101. Each of the panel clips, engages two longitudinally adjacent panels in the one-panel configuration. In the example embodiment, each panel is held in place by four clips (not shown).

FIGS. 19-34 show an alternative solar tracker system 2100. The alternative solar tracker system 2100 is substantially the same as the solar tracker system 100 shown in FIGS. 1-16B, except as noted below. Any of the features or structural components of the solar tracker system 100 of FIGS. 1-18 18 may alternatively be incorporated into the solar tracker system 2100 and any of the features or structural components of the solar tracker system 2100 may alternatively be incorporated into the solar tracker system 100 unless explicitly stated otherwise herein.

Figure 19:
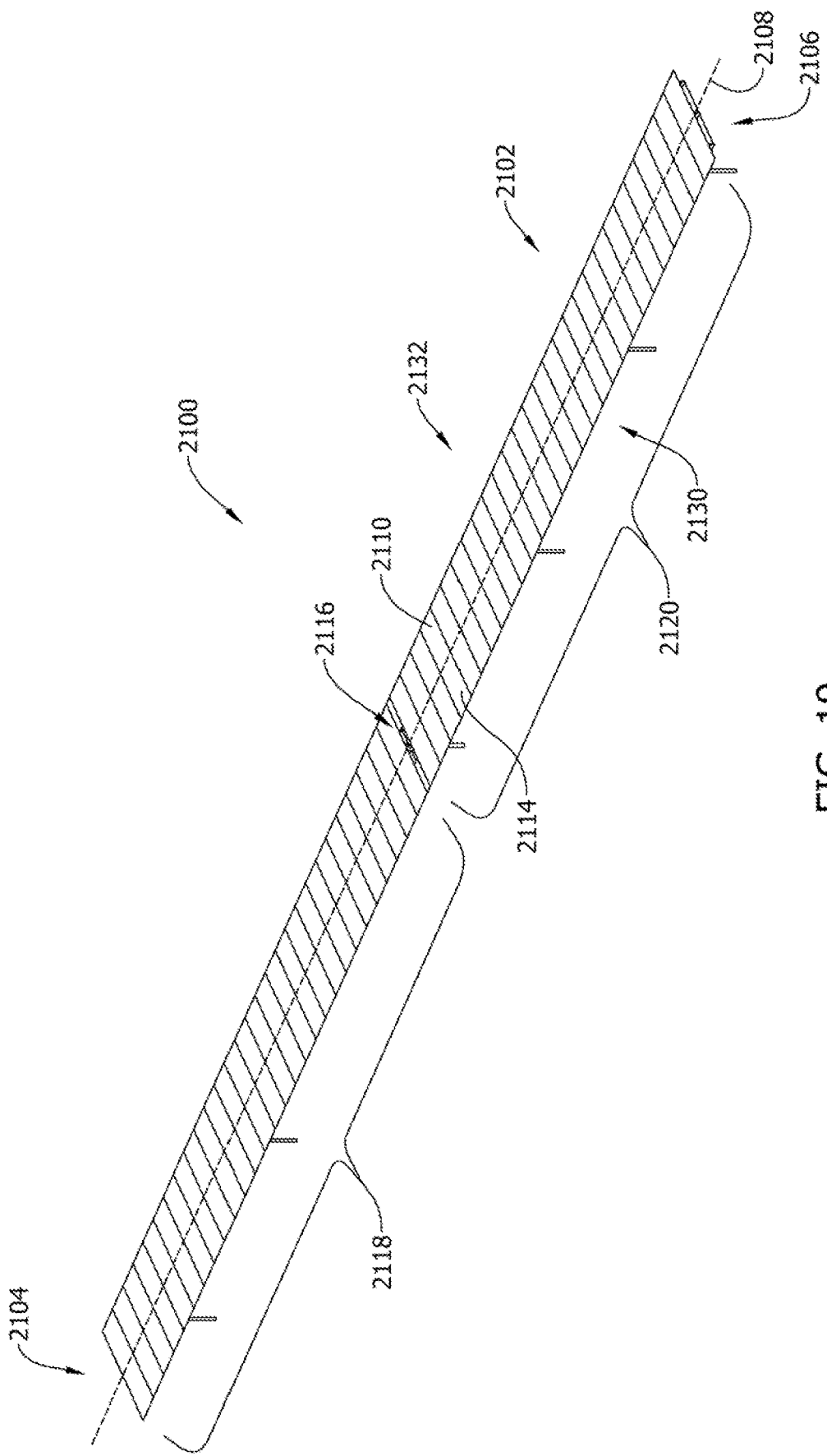
FIG. 19 is a perspective view of an alternative solar tracker system.

The alternative solar tracker system 2100 including an alternative PV solar array row 2102 is shown in FIG. 19. The solar array row 2102 extends between a first end 2104 and a second end 2106 and defines a longitudinal axis 2108 extending between the first and second ends 2104, 2106. The solar array row 2102 includes a plurality of solar panel assemblies 2110 that are substantially the same as the panel assemblies 110 described above with respect to FIG. 1. Each solar panel assembly 2110 extends between a back side 2112 (shown in FIG. 20) and a panel side 2114. In the embodiment of FIG. 19, solar array row 2102 is a two-panel row, though in other embodiments the solar array row 2102 may include any number of rows of panel assemblies 2110, such as, and without limitation, one row of panel assemblies 2110 as shown in the embodiment of FIGS. 17 and 18.

The solar array row 2102 includes a drive 2116 for rotating the panel assemblies 2110 about the longitudinal axis 2108. The solar array row 2102 defines a first section 2118 extending from the first end 2104 to the drive and a second section 2120 extending from the drive 2116 to the second end 2106. The drive 2116 is positioned substantially longitudinally in the middle of the solar array row 2102. In other embodiments, the solar array row 2102 may include multiple drives.

Figure 20:
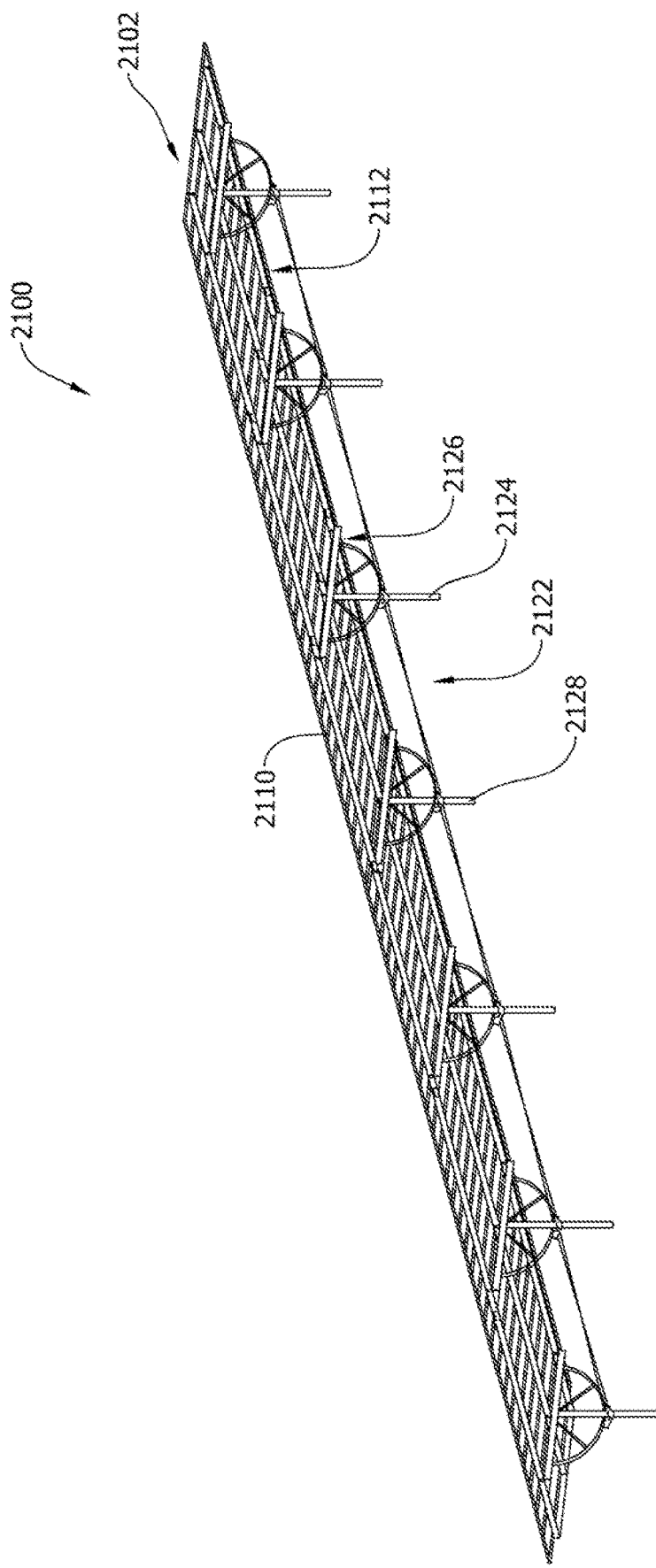
FIG. 20 is a bottom perspective view of the solar tracker system of FIG. 19.

Referring to FIG. 20, the solar array row 2102 includes a mounting assembly 2122 that supports the plurality of solar panel assemblies 2110. The mounting assembly 2122 includes a plurality of posts 2124 and a pivotable frame assembly 2126 to which the solar panel assemblies 2110 are connected. The plurality of posts 2124 includes a central post 2128 which supports the drive. The pivotable frame assembly 2126 is rotatably connected to each of the posts 2124 to enable rotation of the solar panel assemblies 2110 about the longitudinal axis 2108 (shown in FIG. 19). In contrast with the I-beam posts 124 (shown in FIG. 2) the posts 2124 have a cylindrical or tubular shape, but other types of posts may be used. The solar array row 2102 of this embodiment includes seven posts 2124, though any suitable number of posts may be used.

Figure 21:
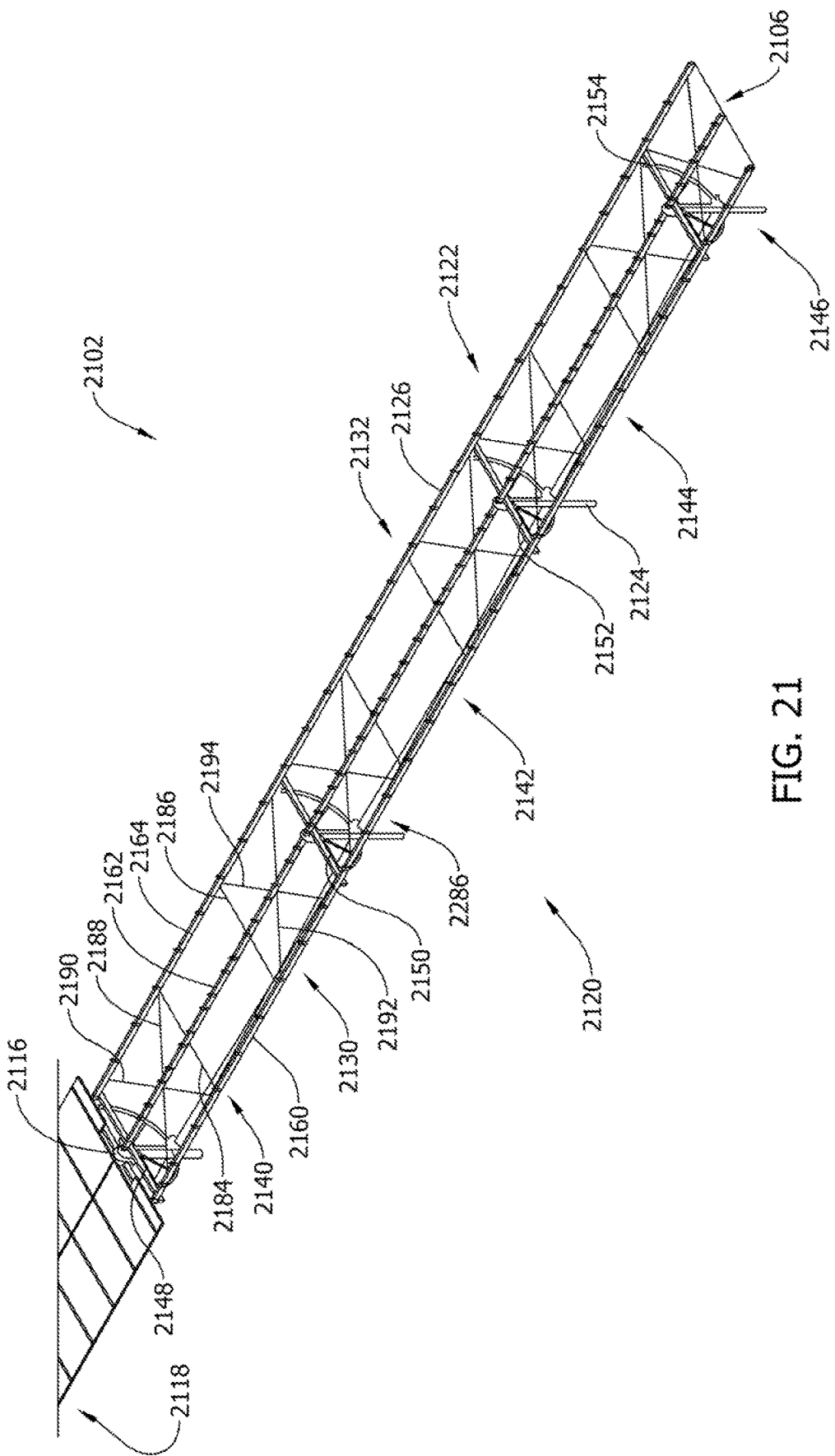
FIG. 21 is a perspective view of a portion of the solar array row of FIG. 19, with some of the solar panels removed to reveal construction of the array row.

FIG. 21 shows a portion of the solar array row 2102 of FIG. 19 with the panel assemblies of the second row section 2120 removed to reveal the construction of the mounting assembly 2122. Although the mounting assembly 2122 is described with respect to the second section of the row 2102, the mounting assembly 2122 is substantially the same in the first section 2118 of the row 2102 (FIG. 19) as in the second row section 2120.

Referring to FIG. 21, the frame assembly 2126 includes a first frame section 2140, a second frame section 2142, a third frame section 2144, and a fourth frame section 2146 extending between adjacent posts 2124. The frame assembly 2126 further includes a plurality of longitudinally extending frame tubes 2160, 2162, 2164 and a plurality of lateral beams 2148, 2150, 2152, 2154 extending between the frame tubes 2160, 2162, 2164.

Figure 24:
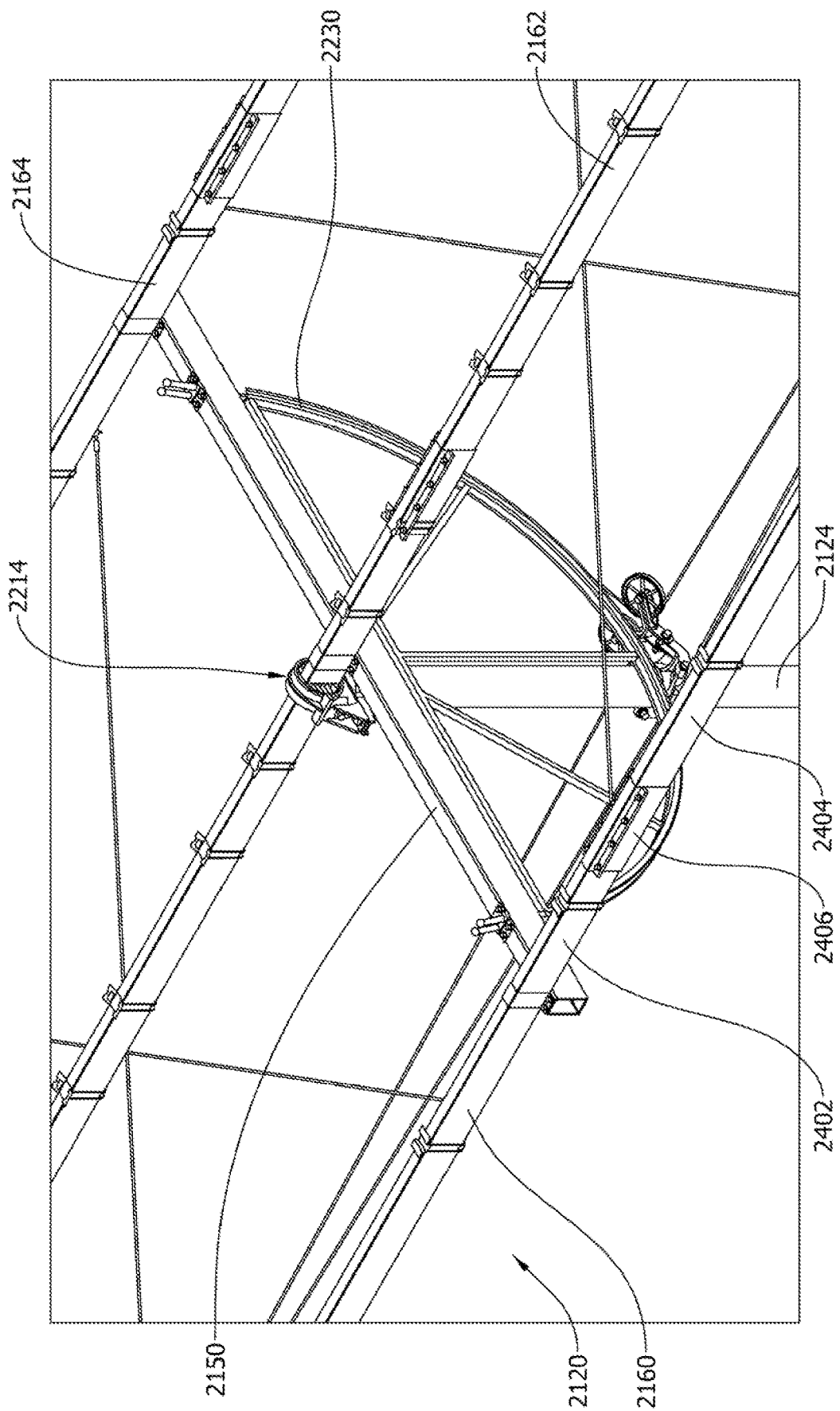
FIG. 24 is an enlarged perspective view of the portion of the solar array row of FIG. 19, showing a lateral beam having a flywheel and a portion of the frame assembly of the solar array row.

The frame tubes 2160, 2162, 2164 include a first side frame tube 2160, a second side frame tube 2164, and a central frame tube 2162 positioned laterally between the first side frame tube 2160 and the second side frame tube 2164. The lateral beams 2150, 2152, 2154 each extend laterally across each of the frame tubes 2160, 2162, 2164 and the frame tubes 2160, 2162, 2164 are seated on and attached to a top side 2400 (shown in FIG. 22) of the lateral beams 2150, 2152, 2154. The lateral beams 2150, 2152, 2154 are further each positioned adjacent to a corresponding post 2124 and are each positioned on a distal or far side of the post 2124, relative to the drive 2116. For example, as shown in the view FIG. 21, each of the lateral beams 2150, 2152, 2154 are positioned on a right side of the corresponding post 2124. Referring to FIG. 21, each of the frame tubes 2160, 2162, 2164 are illustrated schematically as single-piece tubes that extend longitudinally from the drive 2116 to the second end 2106. However, in the example embodiment as shown in FIG. 24, the frame tubes 2160, 2162, 2164 are each made up of a plurality of tube sections 2402, 2404 that are connected by connector clamps 2406.

Each of the first, second, and third frame sections 2140, 2142, 2144 include cross tubes extending laterally between the frame tubes 2160, 2162, 2164. For example, the first frame section 2140 includes a first cross tube 2184 mounted to the first side frame tube 2160 and the second side frame tube 2164. A second cross tube 2186 is mounted to the first side frame tube 2160 and the second side frame tube 2164 and is positioned longitudinally between the first cross tube 2184 and the second lateral beam 2150. The second and third frame sections 2142, 2144 each include two cross tubes that are substantially the same as the first and second cross tubes 2184, 2186 of the first frame section 2140.

The frame assembly 2126 further includes tie-rods 2188-2194 in each of the frame sections 2140, 2142, 2144, 2146. The first frame section 2140 includes a first tie-rod 2188 that is mounted to the first side frame tube 2160 proximate the first lateral beam 2148 and is also mounted to the first cross tube 2184 proximate the second side frame tube 2164. A second tie-rod 2190 is suitably mounted to the second side frame tube 2164 proximate the first lateral beam 2148 and the first cross tube 2184 proximate the first side frame tube 2160. Two tie-rods 2192, 2194 are also mounted between the second cross tube 2186 and the first lateral beam 2150 and are arranged in substantially the same "X"-shape as the first and second tie-rod 2188, 2190. Moreover, the second and third frame sections 2142, 2144 also include tie-rods that are arranged in substantially the same "X"-shape as the tie-rod of the first section 2140. In this embodiment, the cross tubes and the tie-rods are suitably made of steel, though in other embodiments, any suitable material may be used.

The cross tubes 2184, 2186 and tie-rods 2188-2194 provide reinforcement to the frame tubes 2160, 2162, 2164 and inhibit bending or twisting of the frame tubes 2160, 2162, 2164 relative to one another. For example, during use, loading may be applied on the panels and the frame assembly 2126 from one or more environmental events, such as precipitation (e.g., snow) or high wind events. The cross tubes 2184, 2186 and tie-rods 2188, 2190, 2192, 2194 provide structural reinforcement to resist bending or twisting of the frame tubes 2160, 2162, 2164 when subjected to such environmental loading.

Figure 22:
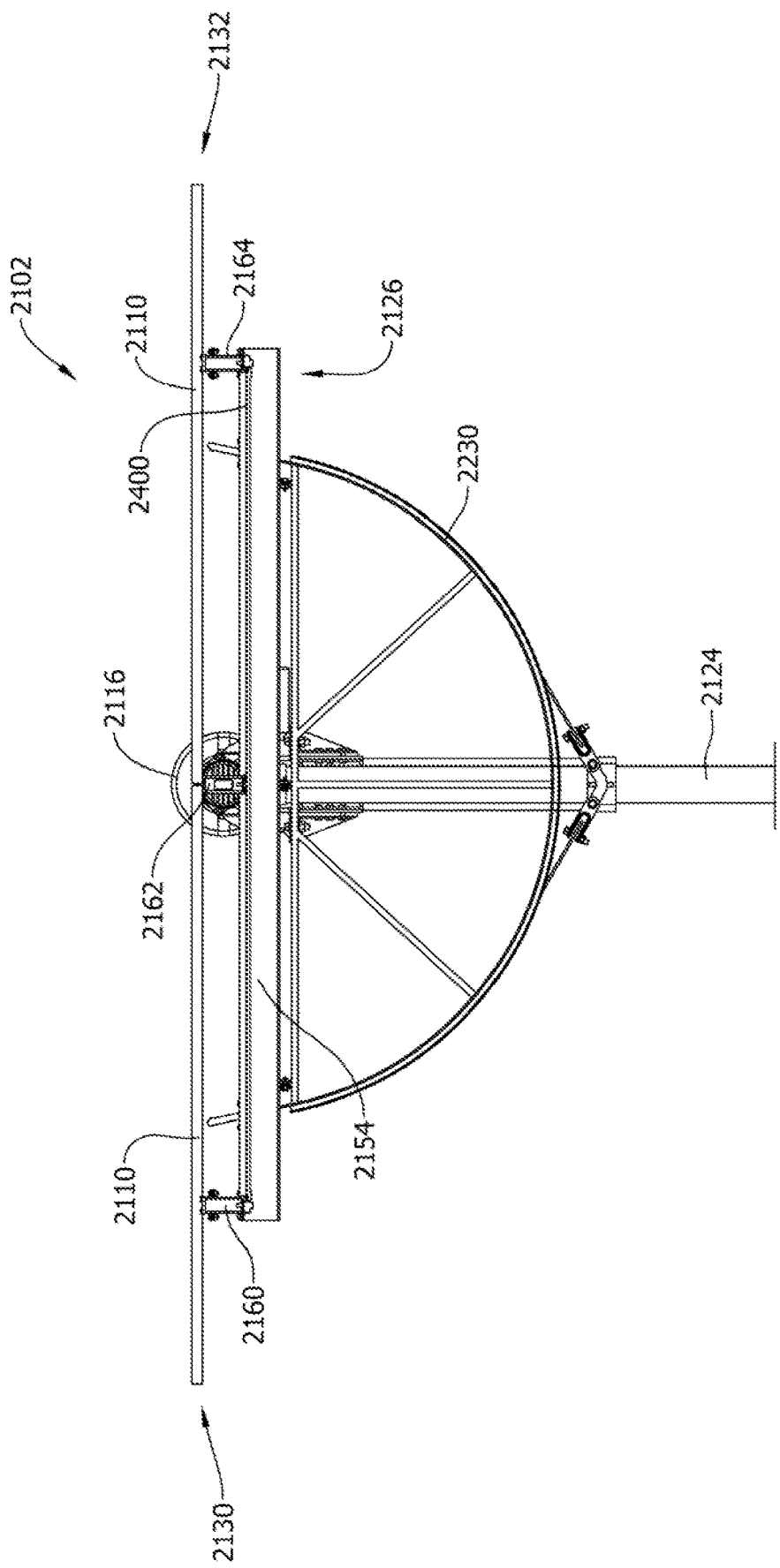
FIG. 22 is a side view of the solar tracker system of FIG. 19.

Referring to FIG. 22, a pair of panel assemblies 2110 are seated on the frame tubes 2160, 2162, 2164 and extend laterally across the tubes to define a first side 2130 and an opposed second side 2132 of the row 2102.

Figure 23:
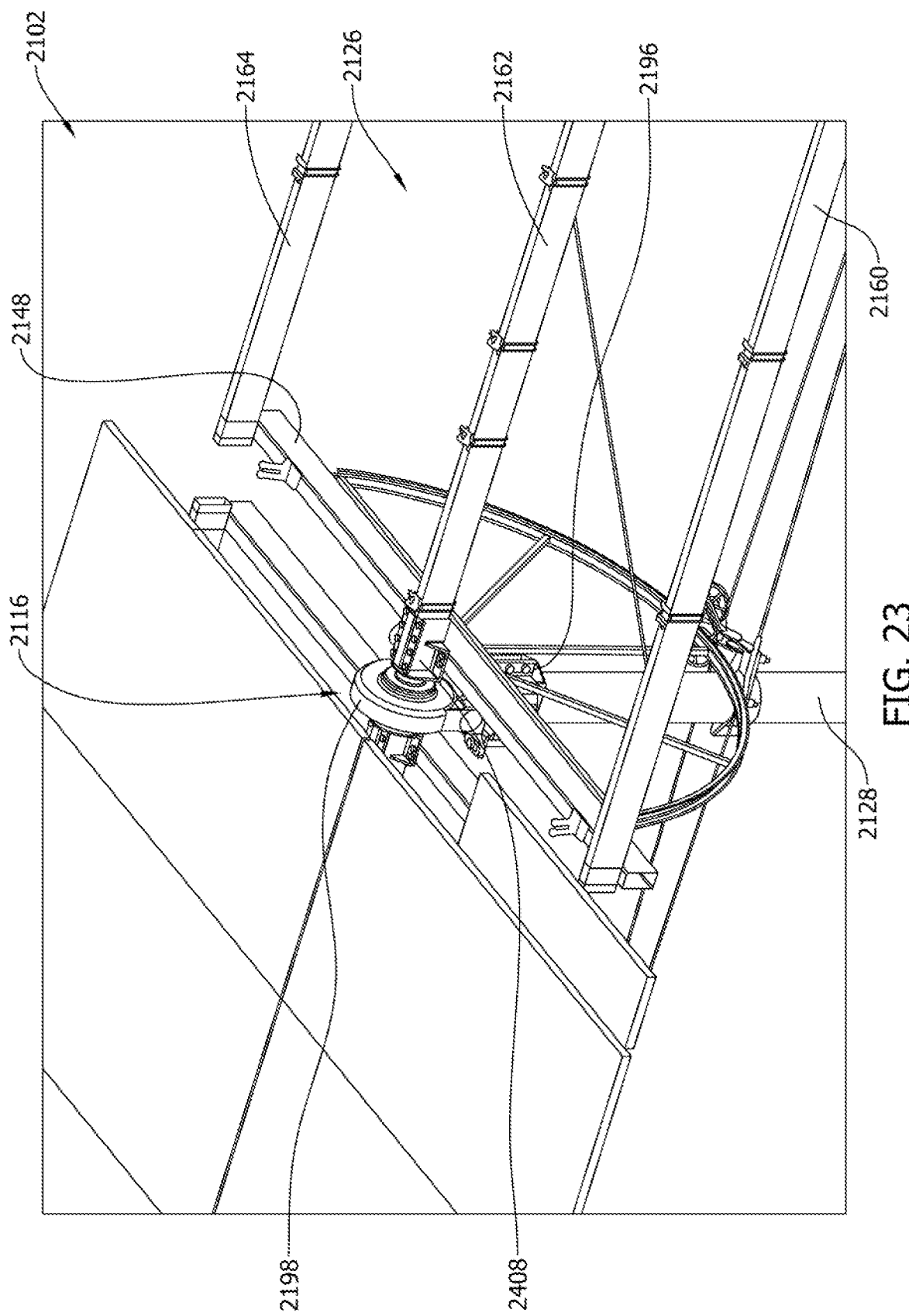
FIG. 23 is an enlarged perspective view of the portion of the solar array row of FIG. 21, showing a drive and a portion of a frame assembly of the solar array row.

FIG. 23 shows an enlarged view of a portion of the solar row 2102 shown in FIG. 21. The drive 2116 is connected to the central post 2128 by a drive bracket 2196. The drive 2116 includes a drive housing 2198 that is mounted to the drive bracket 2196 and the drive bracket 2196 is mounted to the central post 2128. The drive 2116 further includes at least one slewing ring (not shown) positioned within the housing 2198 and being rotatable relative to the housing 2198. The pivotable frame assembly 2126 includes a saddle bracket 2408 that connects the central frame tube 2162 to the slewing ring of the drive 2116. The central frame tube 2162 is clamped within the saddle bracket 2408 and the saddle bracket 2408 is attached to the slewing ring (not shown) of the drive 2116. In example of FIG. 23, the saddle bracket 2408 is further attached to the first lateral beam 2148. The drive 2116 shown in FIG. 23 is a slew drive, though in other embodiments the mounting assembly 2122 may include another suitable drive that enables the solar array row 2102 to function as described. The drive 2116 also engages the pivotable frame assembly 2126 of the first row section 2118 (shown in FIG. 19) in substantially the same manner as described with respect to the second row section 2120.

FIG. 24 is an enlarged view showing the second lateral beam 2150 of the second row section 2120. The lateral beam 2150 is attached to each of the frame tubes 2160, 2162, 2164 to enable conjoint rotation of the frame sections 2140, 2142 with the lateral beam 2150 when the drive 2116 (shown in FIG. 23) is actuated. The central frame tube 2162 is rotatably coupled to the post 2124 by a bushing assembly 2214 such that the lateral beam 2150 may rotate within the bushing assembly 2214 about the longitudinal axis 2108 (shown in FIG. 19).

Figure 25:
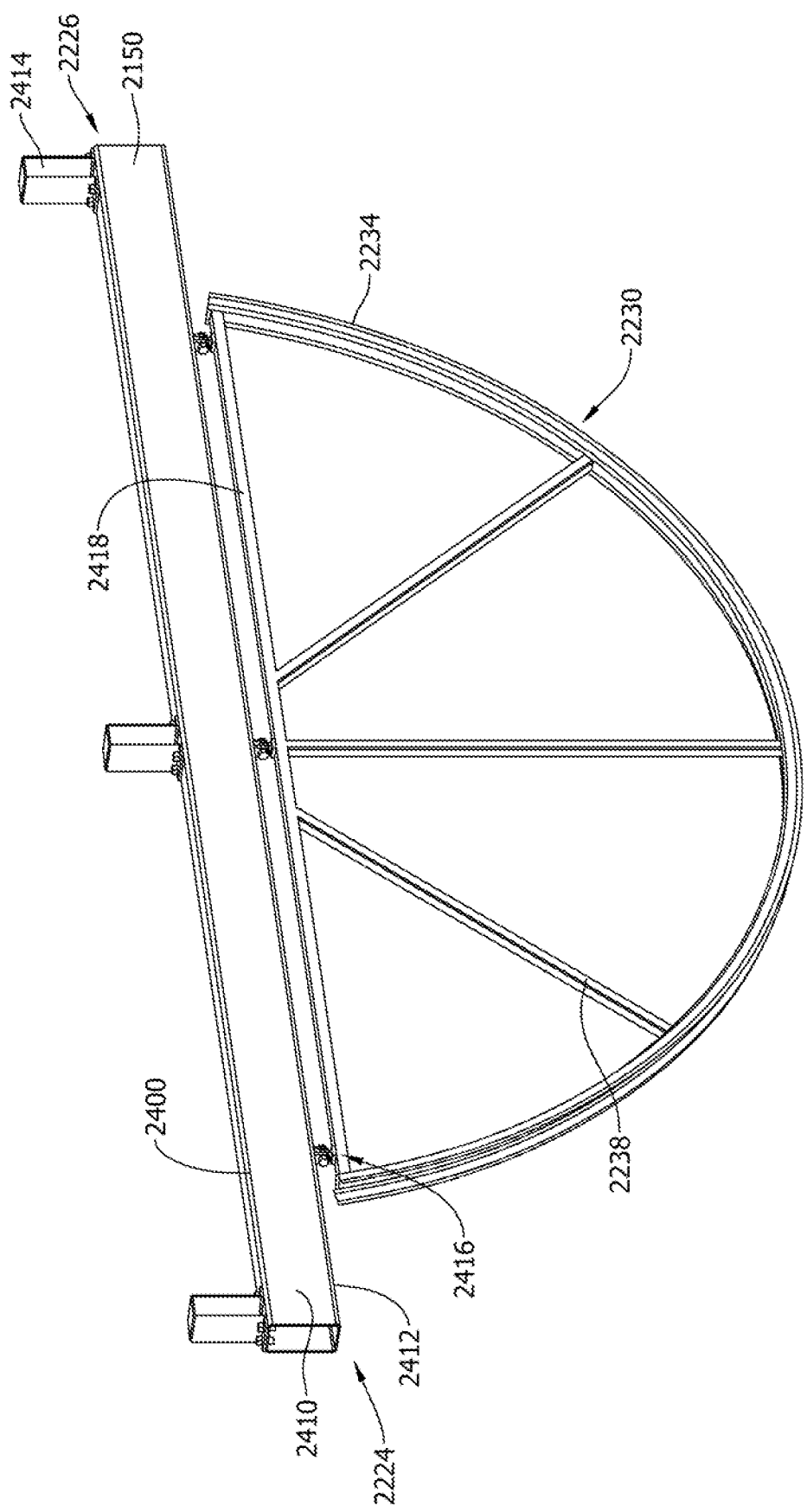
FIG. 25 is a perspective view of the lateral beam and flywheel of FIG. 24.

FIG. 25 shows a perspective view of the lateral beam 2150 and flywheel 2230 shown in FIG. 24. The lateral beam 2150 includes a body 2410 that is substantially hollow and includes the top side 2400 and an opposed bottom side 2412. The body 2410 further extends laterally from a first end 2224 to an opposed second end 2226. A plurality of clamps 2414 are attached on the top side 2400 of the lateral beam 2150 for attaching the frame tubes 2160, 2162, 2164 (shown in FIG. 24) thereto. The flywheel 2230 is pivotably mounted to the bottom side 2412 of the lateral beam 2150 by a plurality of pivot mounts 2416. As shown in FIG. 25, three pivot mounts 2416 are spaced laterally on the beam 2150 connecting the flywheel 2230 to the lateral beam 2148. The pivot mounts 2416 facilitate pivoting the flywheel 2230 relative to the lateral beam about a transverse axis (not shown) that is generally perpendicular to the longitudinal axis (shown in FIG. 19) and extends through each of the pivot mounts 2416.

In the embodiment of FIG. 25, the flywheel 2230 has a semicircular shape and is sized to receive four opposed cables 2290a, 2290b, 2292a, and 2292b (shown in FIG. 30A) of the cable tensioning system 2286 therein. The flywheel 2230 includes a peripheral section 2234, a diametric section 2418, and a plurality of spokes 2238 extending between the peripheral section 2234 and the diametric section 2418. The peripheral section 2234 extends along an arc that subtends an angle of approximately 180 degrees. The peripheral section 2234 further defines grooves (not shown) therein for receiving the cables 2290a, 2290b, 2292a, and 2292b similar to the grooves 234 shown in FIG. 8.

Figure 26:
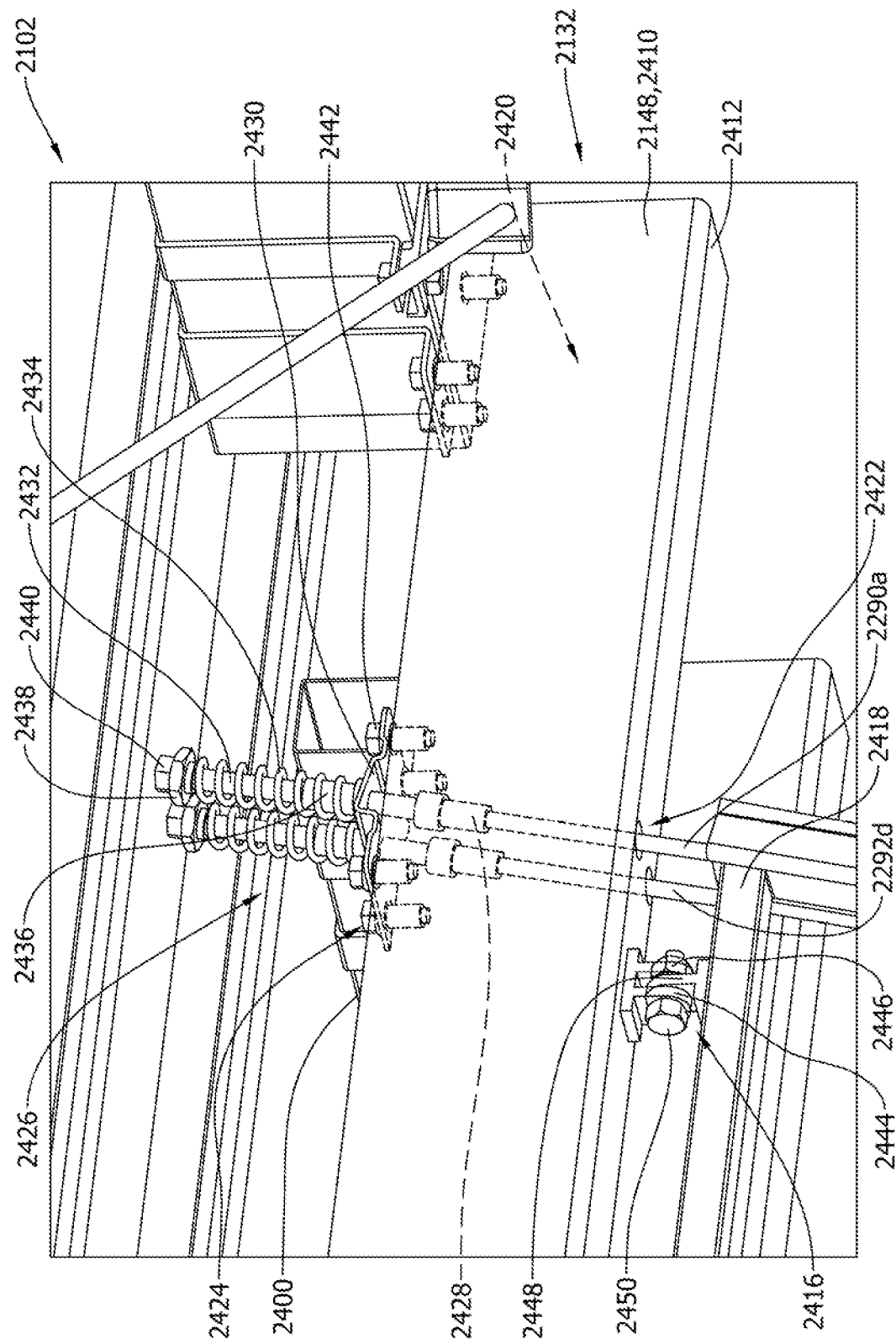
FIG. 26 is an enlarged perspective view of a portion of the lateral beam and flywheel of FIG. 24, showing cables extending through the lateral beam and a spring cable mount.

FIG. 26 shows an enlarged view of the portion of the solar array row 2102 shown in FIG. 23 proximate the second side 2132 of the row 2102. In the view of FIG. 26, broken lines are used to show structural elements within the first lateral beam 2148.

Figure 30A:
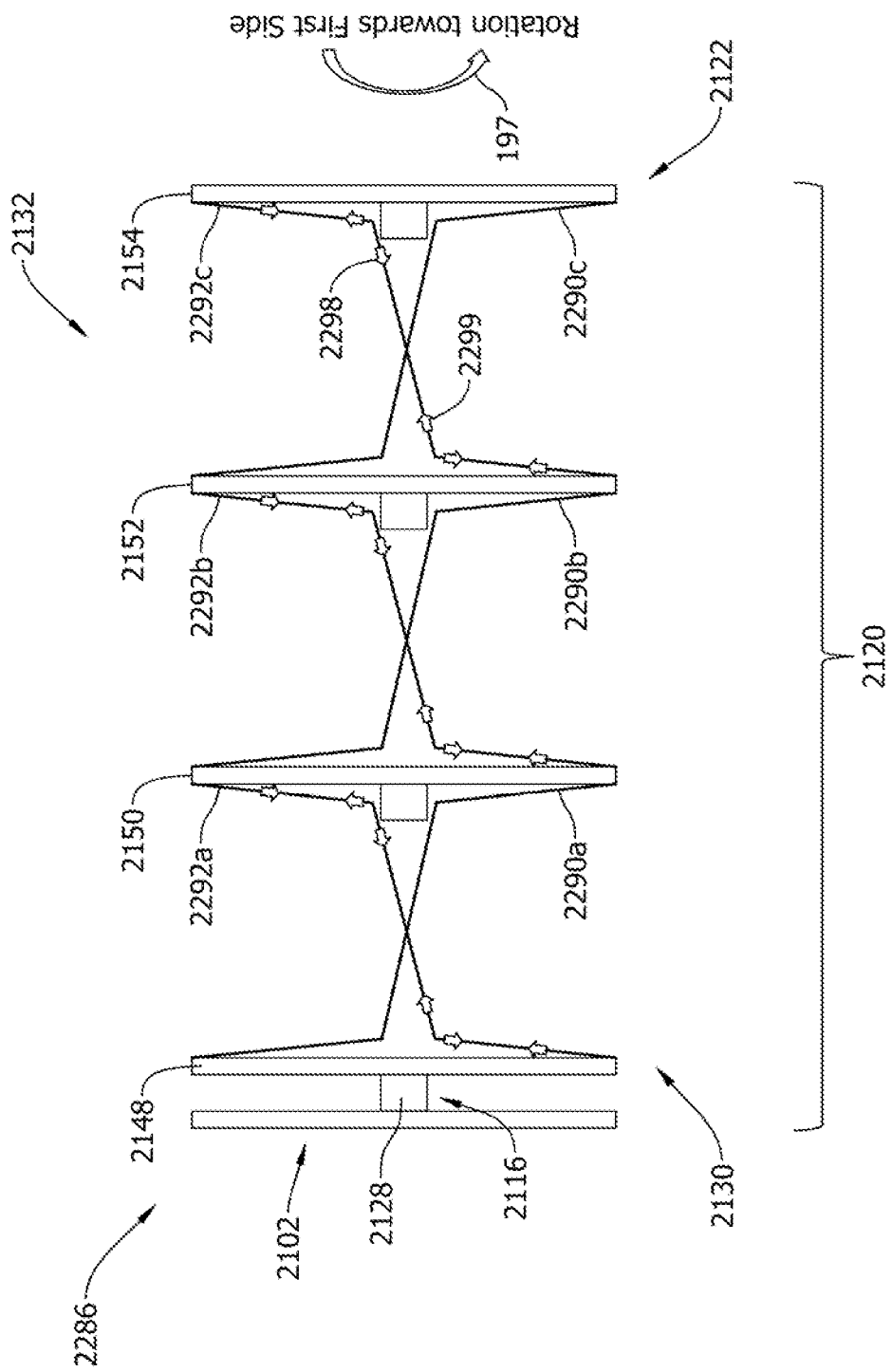
FIG. 30A is a schematic view of a cable tensioning system of the portion of the solar array row of FIG. 21, showing torsional loading on the row in a first direction.

Referring to FIG. 26, the body 2410 of the first lateral beam 2148 defines an internal cavity 2420, a pair of bottom apertures 2422 on the bottom side 2412 of the beam 2148, and a plurality of apertures 2424 on the top side 2400 of the beam 2148. First and second cables 2290a, 2292d extend from the peripheral section 2234 of the flywheel 2230 and are attached to the lateral beam 2148 by a spring cable mount 2426. The first cable 2290a extends from the first lateral beam 2148 to an opposed end of the second lateral beam 2150 proximate the first side 2130, as shown in FIG. 30A. The second cable 2292d extends from the first lateral beam 2148 and to an opposed end of an additional lateral beam (not shown) of the first section 2118 of the row 2102 (shown in FIG. 19).

The spring cable mount 2426 includes a pair of cable end connectors 2428, a spring bracket 2430, a pair of stud rods 2432, a pair of biasing devices 2434, a pair of spring bushings 2436, a pair of spring holder nuts 2438, and a pair of end nuts 2440. In the example embodiment, each of the cables 2290a, 2292d of the cable tensioning system 2286 are connected to a corresponding lateral beam 2148 via a spring cable mount 2426 that is substantially the same as the spring cable mount 2426 shown in FIG. 26.

Referring to FIG. 26, the first and second cables 2290a, 2292d each extend through one of the respective pair of bottom apertures 2422, and into the internal cavity 2420 to a respective cable end connector 2428. The cable end connectors 2428 attach ends of the cables 2290a, 2292d to a corresponding threaded stud rod 2432. The threaded stud rod 2432 threadably engages corresponding threads (not shown) within the cable end connectors 2428. The spring bracket 2430 is attached on top side 2400 of the body 2410 of the beam 2148 by a plurality of fasteners 2442, which extend through a corresponding aperture 2424 on the top side 2400. The stud rods 2432 each extend through apertures (not shown) on the top side 2400 and through the spring bracket 2430. The end nut 2440 and the spring holder nut 2438 are each threaded on distal ends of the stud rod 2432. The biasing devices 2434 each extend from the spring bracket 2430 and to the corresponding spring holder nut 2438. In the example of FIG. 26, the biasing device 2434 is a compression spring, though in other embodiments, any other suitable biasing device may be used. The spring bushing 2436 is attached the stud rod 2432 and extends around a periphery of the stud rods. The spring cable mount 2426 facilitates maintaining tension in the cables 2290a, 2292d across varying environmental conditions, such as a change in temperature, that may constrict or expand an overall length of the cables 2290a, 2292d.

A pivot mount 2416 connecting the flywheel 2230 to the lateral beam 2148 is further shown in FIG. 26. The pivot mount 2416 includes first and second beam projections 2444, 2446, a flywheel projection 2448, and a flywheel pin 2450. The first and second beam projections 2444, 2446 are laterally spaced on the bottom side 2412 of the lateral beam 2148 and the flywheel projection 2448 projects upward from the diametric section 2418 of the flywheel 2230. The flywheel pin 2450 extends through openings (not shown) in each of the projections 2444, 2446, 2448. More specifically, the flywheel pin 2450 extends through the first beam projection 2444, the flywheel projection 2448, and the second beam projection 2446. The flywheel pin 2450 is secured in position by nuts at opposing ends thereof.

Figure 27:
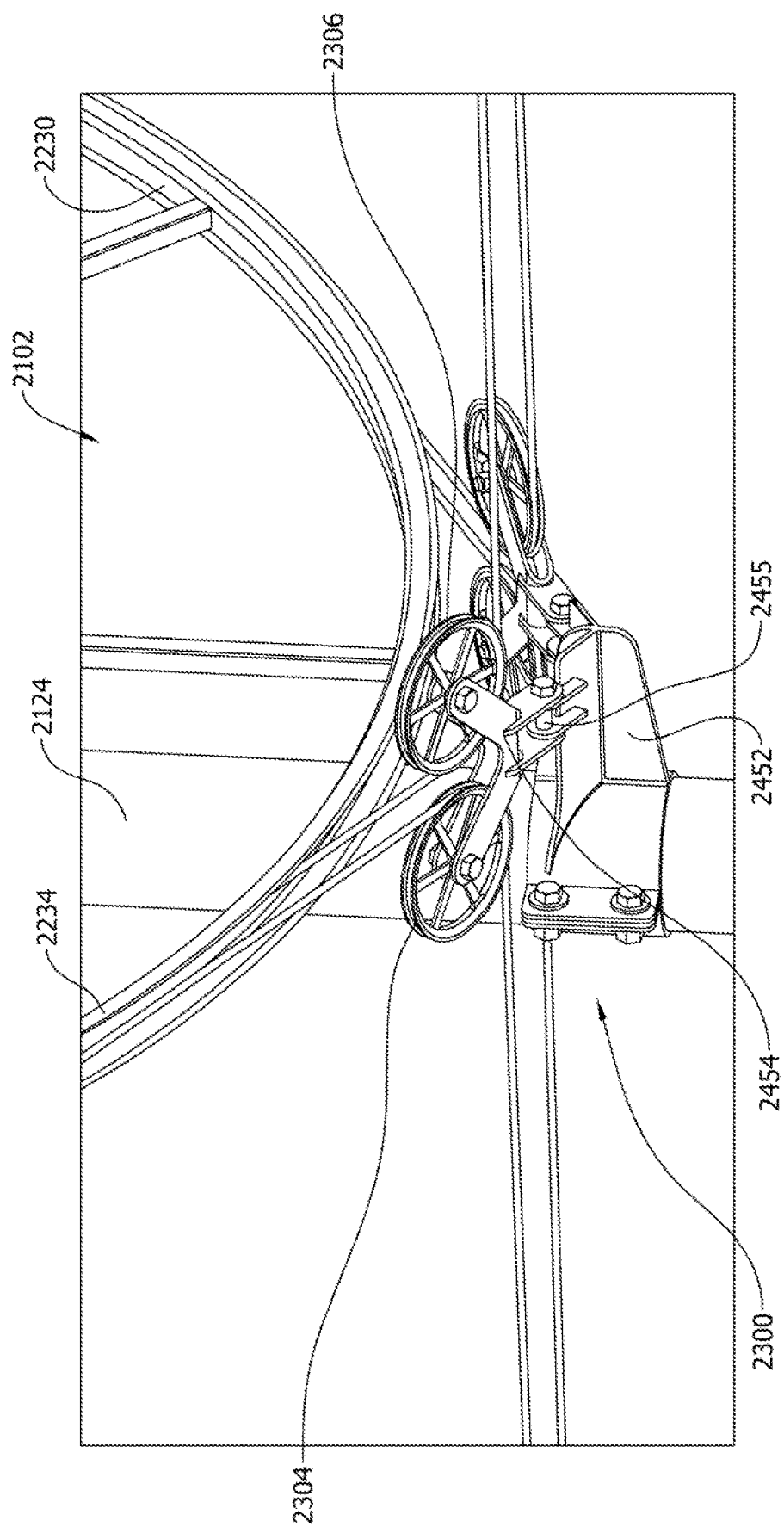
FIG. 27 is an enlarged perspective view showing a pulley mount of the solar array row of FIG. 19.

FIG. 27 shows an enlarged view of the pulley mount 2300 of the solar array row 2102 shown in FIG. 19. In the example embodiment, the pulley mount 2300 includes a post bracket 2452, and a pair of pulley wing brackets 2454 pivotally connected to the post bracket 2452. A pin The post bracket 2452 is clamped around the post 2124 and held in position by a friction fit with the post 2124. In other embodiments, the pulley mount 2300 may further include a post fastener (not shown) that extends through the post bracket 2452 and the post 2124 and attaches the post bracket 2452 to the post 2124.2455 extends through the wing bracket 2304 and the post bracket 2452 to provide a pivotable coupling of the wing bracket 2304 relative to the post bracket 2452.

The pulley wing brackets 2454 are each offset from the post 2124 and are positioned in alignment with the peripheral section 2234 of the flywheel 2230. Each of the pulley wing brackets 2454 includes a pair of pulleys 2304, 2306 rotatably mounted thereto that direct a corresponding cable tangentially to the peripheral section 2234 of the flywheel 2230.

Figure 28:
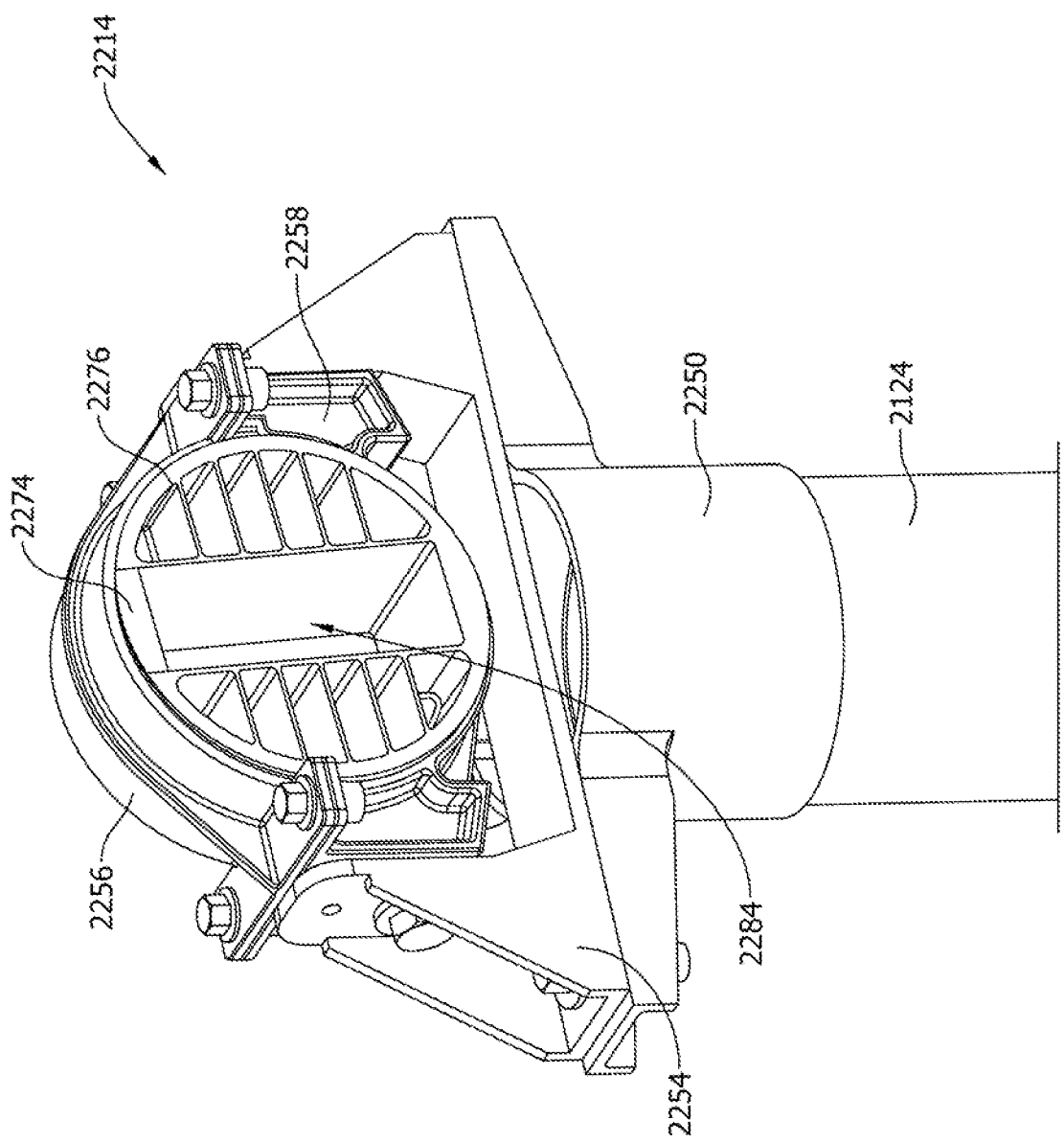
FIG. 28 is a perspective view of a bushing assembly and post of the solar array row of FIG. 19.

FIG. 28 shows an enlarged view of the post 2124 and bushing assembly 2214 of FIG. 24. The bushing assembly 2214 is attached to the post 2124 and includes a journal bracket 2250, a bushing bracket 2254, a bottom bushing housing 2258, a top bushing housing 2256, a bearing 2276, and a bearing top 2274. The bearing 2276 and bearing top 2274 collectively define a beam opening 2284 for receiving the beam therein. The beam opening 2284 has a rectangular shape and is sized in correspondence with the rectangular profile of the central frame tube 2162 (shown in FIG. 24).

Figure 29:
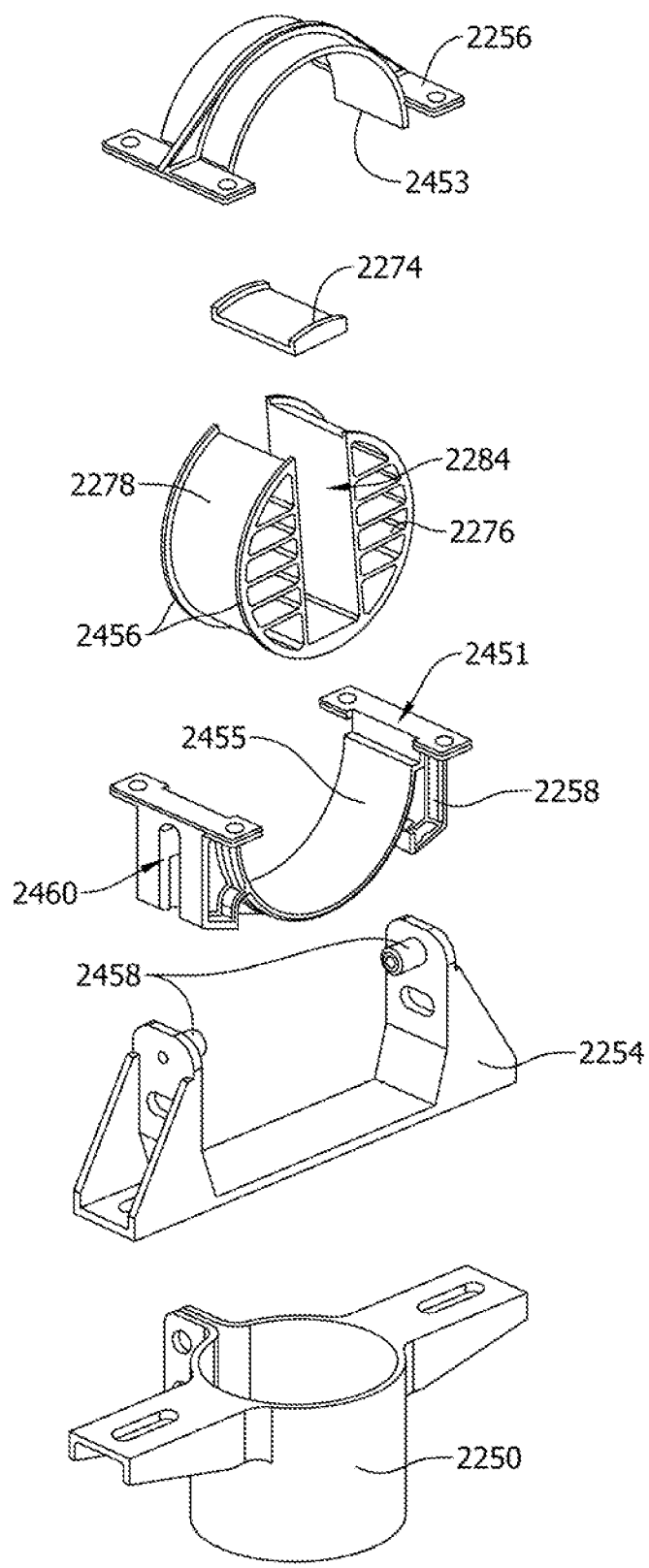
FIG. 29 is an exploded view of the bushing assembly of FIG. 28.

Referring to FIG. 29, the bottom bushing housing 2258 defines a pair of inner recesses 2451 that are sized to receive a correspondingly sized portion of an inner rim 2453 of the top bearing housing 2256. When assembled, the inner rim 2453 of the top bearing housing 2256 and an inner rim 2455 of the bottom bearing housing 2258 provide a continuous surface that contacts an outer surface 2278 of the bearing 2276.

The bearing 2276 includes a pair of end flanges 2456 and the outer surface 2278 extends longitudinally between the end flanges 2456. The end flanges 2456 retain the bearing 2276 within the top bushing housing 2256 and the bottom bushing housing 2258. The bushing bracket 2254 attaches to the journal bracket 2250 and includes a pair of inwardly extending pins 2458 that are received in corresponding slots 2460 defined within the bottom bushing housing 2258. The engagement between the pins 2458 and the slots 2460 facilitate pivoting the bearing 2276 relative to the post 2124 about a lateral axis (not shown) that extends through each of the pins 2458.

The pivot mounts 2416 (shown in FIG. 26), the pulley mounts 2300 (shown in FIG. 27), and the pins 2458 of the bushing bracket 2254 are each hinged joints that enable pivotable movement of corresponding portions of the solar array row 2102. The hinged joints facilitate installing the solar row 2102 on an inclined terrain. For example, referring back to FIG. 19, the solar array row 2102 may be installed on a ground surface having an incline of at least 10 degrees, 20 degrees, or 30 degrees while still enabling the solar tracker system 2100 to function as described herein.

Figure 30B:
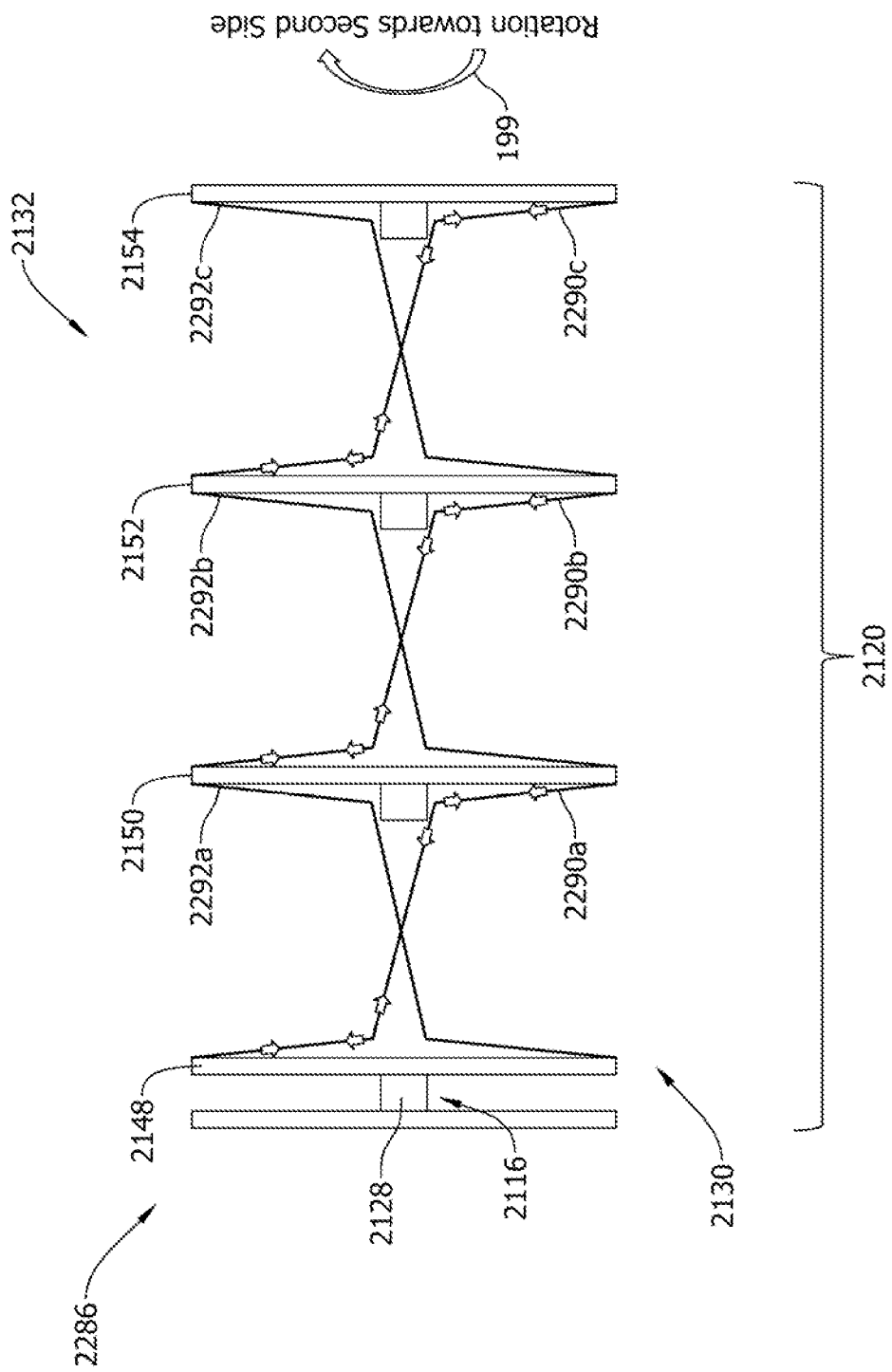
FIG. 30B is another schematic view of the cable tensioning system of FIG. 30A, showing torsional loading on the row in a second direction.

Referring to FIGS. 30A and 30B, the solar array row 2102 of the example embodiment further includes a cable tensioning system 2286 for damping torsional loads on the solar array. The cable tensioning system 2286 is illustrated schematically in FIGS. 30 and 31. The cable tensioning system 2286 is substantially similar to the cable tensioning system 286 shown in FIGS. 11A and 11B except that, in the embodiment of FIGS. 30A and 30B, the cable tensioning system 2286 does not include H-tubes but instead includes the lateral beams 2150, 2152, 2154. The cable tensioning system 2286 includes a crossing network of cables 2288 which connect adjacent beams 2150, 2152, 2154 of the frame assembly 2126 at opposed ends.

FIG. 30A is a schematic view of the second row section 2120 shown in FIG. 22 schematically illustrating the cables 2290a-2290c, 2292a-2292c of the cable tensioning system 2286. Specifically, the cables 2290a-2290c, 2292a-2292c of the cable tensioning system 2286 have an exaggerated thickness in the view of FIG. 30A to highlight paths of the cables. The cables 2290a-2290c, 2292a-2292c of the cable tensioning system 2286 include a plurality of first cables 2290a-2290c and a plurality of second cables 2292a-2292c. The first and second cables 2290a-2290c, 2292a-2292c are arranged to cross one another and to each extend to a laterally opposed end and adjacent lateral beam 2148. The first and second cables are each provided in tension on the mounting assembly 2122 to provide damping resistance from torsional loads on the row 2102, such as loads resulting from wind induced vibrations of the row 2102.

Still referring to FIG. 30A, a first cable 2290a is attached to the first lateral beam 2148 on the second side 2312 and extends to the second lateral beam 2150 at the first side 2130. A second cable 2292a is attached to the first lateral beam 2148 on the first side 2310 and extends to the second lateral beam 2150 on the second side 2132. Thus, the first cable 2290a and the second cable 2292a cross one another between the first lateral beam 2148 and the second lateral beam 2150. Similarly, additional first cables 2290b and 2290c and second cables 2292b and 2292c extend between the second and third lateral beams 2150, 2152, and the third and fourth lateral beams 2152, 2154, respectively.

As also shown in FIG. 30A, the network of the first and second cables 2290a-2290c, 2292a-2292c transfer torsional loads applied on the row 2102 from wind induced vibrations to the central post 2128. The cables 2290a-2290c, 2292a-2292c act as a static support for the each of the lateral beams 2148-2154 to restrain oscillations or rapid vibration of the beams 2148-2154 and prevent torsional instabilities in the row 102. For example, since each cable 2290a-2290c, 2292a-2292c extends to a laterally opposed end on an adjacent lateral beam, any torsional loads experienced on one side of the row 2102 are translated by the cables to the other side of the row 2102, and ultimately to the center post 2128. At least partially due to the beams being freely rotatable within the bushing assemblies, the cables 2290a-2290c, 2292a-2292c direct torsional loads on the row 2102 back to the drive 2116 on the center post 2128, which is not freely rotatable. In particular, the drive 2116 at the center post 2128 provides restraint against rotation of the beams in response to torsional loading on the beams, thereby balancing the torsional loads on the row 2102. The balancing of torsional loads by the cables 2290a-2290c, 2292a-2292c dampens vibrations on the row 2102 to prevent torsional instabilities, such as wind induced vibrations, that may deteriorate or damage components of the solar array row 2102. In the example embodiment the solar array row 2102 is over damped, though in other embodiments it may be critically damped or under damped.

For example, as shown in FIG. 30A, a torsional force in the first direction 197 is applied on the fourth lateral beam 2154 of the row 2102. The first direction 197 is towards the first side 2130 (i.e., in the counter-clockwise direction of FIG. 21). The torsional force is transferred through tension (shown schematically in FIG. 30A by force vector arrows 2298) in the second cables 2292a-2292c to the drive 2116 in substantially the same manner as described with respect to the row 102 shown in FIG. 11A. When the drive 2116 is locked in position, the drive 116 provides a substantially opposite restraining force (shown schematically in FIG. 30A by force vector arrows 2299) in the second cables 2292a-2292c, which is translated to each of beams 2148-2154 thereby restraining rotation of each of the arms and balancing the torsional loading on the beams 2148-2154.

Similarly, referring to FIG. 30B, when a torsional force is applied on the row 2102 in the second direction 199 opposite the first direction 197 (i.e., rotating the arms towards the second side 2132 in the clockwise direction of FIG. 21), the force is transferred by the first cables 2290a-2290c from each of the beams 2148-2154 to the central post 2128 in substantially the same manner as describes with respect to the second cables 2292a-2292c in FIG. 30A. Additionally, the cable tensioning system 2286 functions in substantially the same manner and provides substantially the same functional advantages as described above with respect to the cable tensioning system 286 of FIGS. 11A and 11B.

Figure 31:
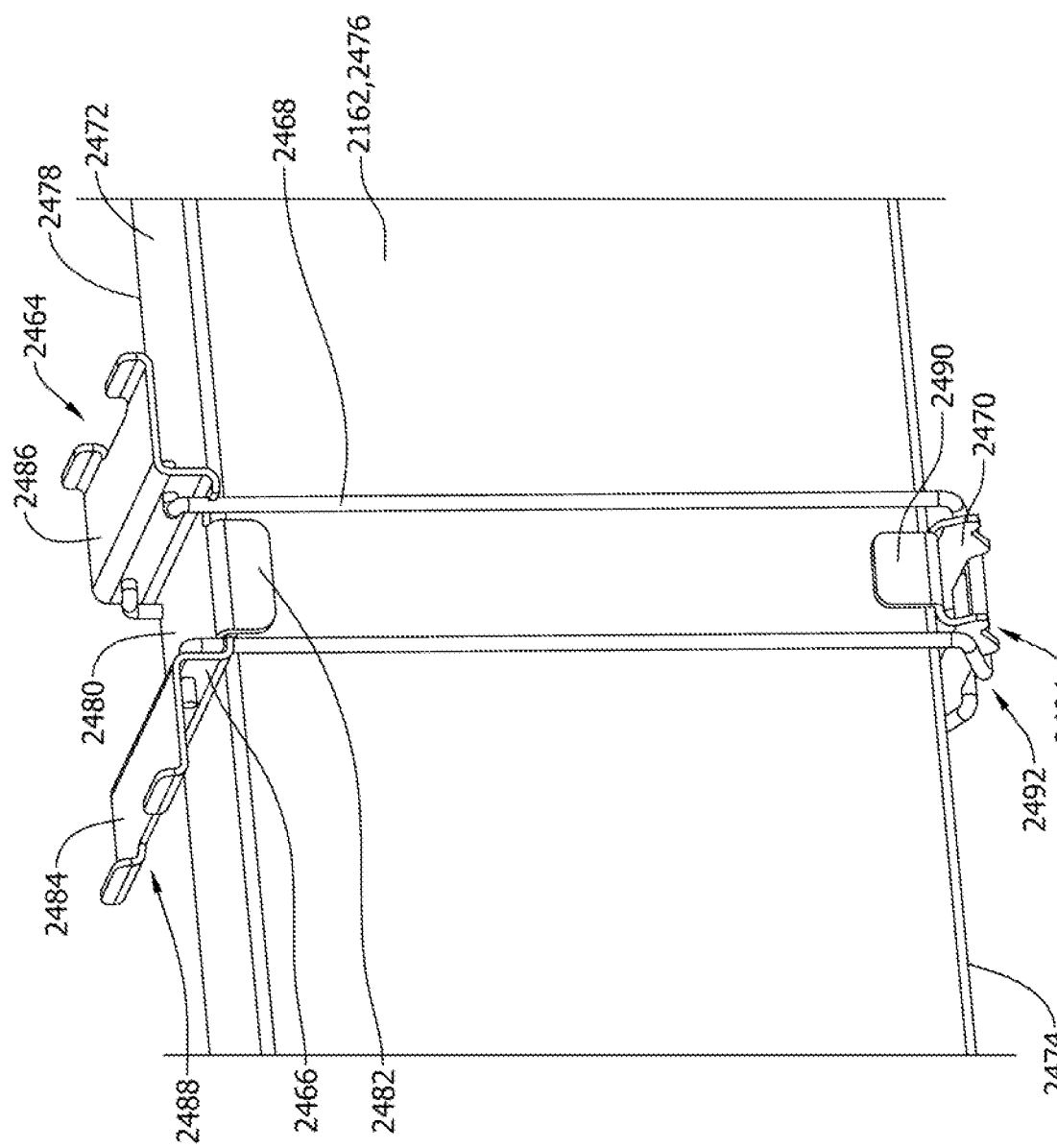
FIG. 31 is a perspective view of a portion of the frame assembly of the solar array row of FIG. 19, showing a clip assembly coupled to a central frame tube with the panels removed.
Figure 32:
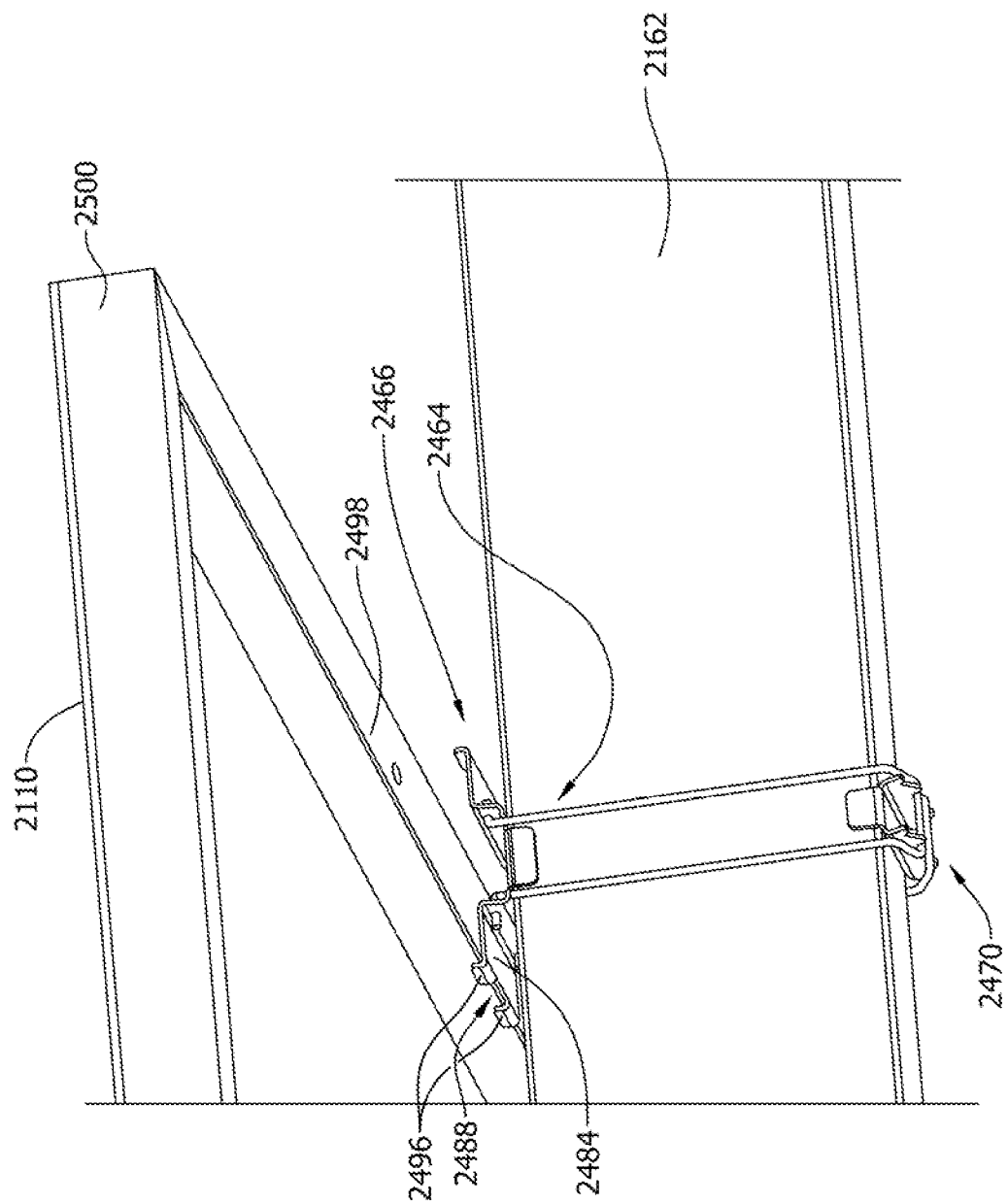
FIG. 32 in another perspective view of the portion of the frame assembly of FIG. 31, showing a panel assembly positioned on the clip assembly.

FIGS. 31 and 32 show another embodiment of a clip assembly 2464 for securing the panel assemblies 2110 to the frame tubes 2160, 2162, 2164 of the solar array row 2102 shown in FIG. 19. The clip assemblies 2464 of FIGS. 31 and 32 may alternatively be used with the solar array rows 102 shown in FIGS. 1-18. The clip assembly 2464 is substantially the same as the clip assembly 1000 shown in FIGS. 16A and 16B, except as otherwise described differently herein.

Referring to FIG. 31, the clip assembly 2464 includes a panel bracket 2466, a pair of spring clips 2468 (both shown in FIG. 32), and a nest clamp 2470. The panel bracket 2466 is seated on a first end wall 2472 of the frame tube 2162 and the nest clamp 2470 is positioned on a second opposed end wall 2474 of the frame tube 2162. The spring clips 2468 extend along opposed side walls 2476, 2478 that each extend between the first end wall 2472 and the second end wall 2474.

The panel bracket 2466 includes a body 2480 having a pair of bracket tabs 2482 (only one shown in FIG. 31) which each extend downward from the first end wall 2472 along an opposed side wall 2476, 2478 of the frame tube 2162. The panel bracket 2466 further includes a first wing section 2484 and a second wing section 2486 extending upwards from the first end wall 2472 and suspended above the first end wall 2472. The wing sections 2484, 2486 each define a clip recess 2488 therein for receiving a correspondingly sized cinch clip (not shown) that secures the panel assemblies 2110 on the panel bracket 2466.

The spring clips 2468 (alternatively referred to herein as a bale) each extend from the panel bracket 2466 and are received in opposed sides of the nest clamp 2470. The nest clamps 2414 include clamp tabs 2490 (one shown in FIG. 30) which extend upwards from the second end wall 2474 and contact the opposed side walls 2476, 2478 of the frame tube 2162. The nest clamps 2414 define an inner spring groove 2492 and an outer spring groove 2494 therein. During installation, the spring clips 2468 may be positioned in the outer spring grooves 2494 to permit adjustment of the clip assemblies 2464 on the frame tube 2162 and are tightly secured by moving the spring clips 2468 into the corresponding inner spring grooves 2492 of the nest clamps 2414. The spring clips 2468 engage the nest clamps 2414 in substantially the same manner as the rail connectors described in U.S. patent application Ser. No. 18/058,392, the entire contents of which is hereby incorporated by reference.

FIG. 32 shows a panel assembly 2110 seated on the first wing section 2484 of the clip assembly 2464. As shown in FIG. 32, the first wing section 2484 includes a pair of wing tabs 2496 which extend around a portion of a lip 2498 of the panel frame 2500. The wing tabs 2496 define the clip recess 2488 therebetween. To secure the panel assembly to the clip assembly 2464, a cinch clip (not shown) is inserted into the clip recess 2488 and engages the lip 2498 and the first wing section 2484 to clamp the panel frame 2500 on the panel bracket 2466.

A method of assembling the solar tracker system includes connecting a first frame tube to a drive of the solar tracker system, where the drive is operable to rotate an array of solar panels about a longitudinal axis. The first frame tube extends from the drive in a direction parallel to the longitudinal axis. The method further includes attaching a lateral beam to the first frame tube and attaching a second frame tube to the lateral beam such that the second frame tube is laterally offset from the first frame tube and extends parallel to the first frame tube. The method further includes mounting a solar panel of the array on the first frame tube and the second frame tube. The method may further include attaching a third frame tube to the lateral beam, where the third frame tube is laterally offset from the first and second frame tubes and is oriented in parallel with the first frame tube and the second frame tube.

At least in part due to the configuration of the cable tensioning systems described herein, the solar array rows 102, 2102 of the present disclosure are able to dampen torsional loads applied on the row without the use of separate damping assemblies, such as shock absorbers, hydraulic or pneumatic dampers, linear actuators, etc. In other words, the systems are free of hydraulic and pneumatic dampers and linear actuators. Also, the configuration of the cable tensioning systems provides separate reinforcements for different loads applied on the row. For example, the tie-rods and cross tubes provide reinforcement against bending loads while the cable tensioning system provides reinforcement against torsional loads. Moreover, the construction of the three frame tubes also reinforces the frame assembly against bending loads, while providing locations for mounting the panel assemblies. As a result, unlike at least some solar tracker systems which include a central torque tube and cantilevered mounting rails that extend laterally from the torque tube, the solar tracker system of the present disclosure does not include any cantilevered rails off the central frame tube. That is, the frame assembly is free of cantilevered lateral rails.

The terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A solar tracker system comprising:
   an array of solar panels arranged in a row and defining a first lateral side and an opposed second lateral side;
   a drive for rotating the array about a longitudinal axis;
   a plurality of posts including a first post and a second post longitudinally spaced from the first post, wherein the drive is mounted on the first post; and
   a first lateral beam connected to the drive and positioned adjacent to the first post;
   a second lateral beam positioned adjacent to the second post;
   a first flywheel connected to the first lateral beam;
   a second flywheel connected to the second lateral beam; and
   a cable attached to the first lateral beam at the first lateral side of the row, the cable extending from the first lateral beam, along the first flywheel and to the second flywheel, the cable further extending from the second flywheel to the second lateral beam and being attached to the second lateral beam at the second lateral side of the row.

2. The solar tracker system of claim 1, wherein the cable is a first cable and wherein the solar tracker system further comprises a second cable attached to the first lateral beam at the second lateral side of the row, the second cable extending from the first lateral beam and further attached to the second lateral beam at the first lateral side of the row such that the first and second cables cross one another between the first lateral beam and the second lateral beam.

3. The solar tracker system of claim 1 wherein the first flywheel is mounted to the first lateral beam and the second flywheel is mounted to the second lateral beam, and wherein the cable contacts the first flywheel and the second flywheel.

4. The solar tracker system of claim 1, wherein the cable provides a restraining force to the second lateral beam in response to a torsional loading on the array for damping the torsional loading.

5. The solar tracker system of claim 1 further comprising a frame assembly including the first lateral beam, the second lateral beam, the frame assembly further comprising:
   a first frame tube connected to the drive and extending therefrom in a direction parallel to the longitudinal axis; and
   a second frame tube laterally offset from the first frame tube and extending parallel to the first frame tube, the first frame tube and second frame tube being sized to support at least one solar panel of the array of solar panels thereon, wherein the first lateral beam and the second lateral beam are each attached to the first frame tube and the second frame tube.

6. The solar tracker system of claim 5, wherein the first frame tube is aligned with the longitudinal axis and the first and second lateral beams each extend perpendicular to the longitudinal axis between the first frame tube and the second frame tube.

7. The solar tracker system of claim 5, wherein the frame assembly further comprises a third frame tube that is laterally offset from the first and second frame tubes and is oriented in parallel with the first frame tube and the second frame tube, the first lateral beam and the second lateral beam each being attached to the third frame tube, and wherein the solar tracker system further comprises a saddle bracket that attaches the first frame tube to the drive, wherein the first frame tube is positioned laterally between the second frame tube and the third frame tube.

8. The solar tracker system of claim 1 wherein the cable is electrically connected to a controller and a signal generation device, the signal generation device being operable to transmit an electrical signal through the cable, and wherein the controller is operable to:

detect whether the electrical signal is received from the cable; and determine whether a cable fault has occurred based on the detection.

9. The solar tracker system of claim 1, wherein the array of panels is a laterally stacked two-panel array.

10. The solar tracker system of claim 1 further comprising:

a first pulley connected to the first post; and a second pulley connected to the second post, wherein the cable extends from the first lateral beam, along the first flywheel and through the first pulley, from the first pulley and to the second pulley and along the second flywheel to the second lateral beam.

11. The solar tracker system of claim 1 further comprising a spring cable mount attaching the cable to the first lateral beam, the spring cable mount including a threaded rod connected to the cable, a stopper nut connected to the threaded rod, and a biasing device engaged with the stopper nut.

12. A solar array row comprising:

a plurality of solar panels defining a first lateral side and an opposed second lateral side of the solar array row;

a drive for rotating the plurality of panels about a longitudinal axis;

a first post and a second post longitudinally spaced from the first post, wherein the drive is mounted on the first post;

a first lateral beam connected to the drive and positioned adjacent to the first post;

a second lateral beam positioned adjacent to the second post;

a first flywheel connected to the first lateral beam;

a second flywheel connected to the second lateral beam; and a cable tensioning system comprising a cable attached to the first lateral beam at the first lateral side of the row, the cable extending from the first lateral beam, along the first flywheel and to the second flywheel, the cable further extending from the second flywheel to the second lateral beam and being attached to the second lateral beam at the second lateral side of the row.

13. The solar array row of claim 12, wherein the cable is a first cable and wherein the solar tracker array row further comprises a second cable attached to the first lateral beam at the second lateral side of the row, the second cable extending from the first lateral beam and further attached to the second lateral beam at the first lateral side of the row such that the first and second cables cross one another between the first lateral beam and the second lateral beam.

14. The solar array row of claim 12 wherein the first flywheel is mounted to the first lateral beam and the second flywheel is mounted to the second lateral beam, and wherein the cable contacts the first flywheel and the second flywheel.

15. The solar array row of claim 12, wherein the cable provides a restraining force to the second lateral beam in response to a torsional loading on the array for damping the torsional loading.

\* \* \* \* \*